US009071759B2

(12) United States Patent
Mori

(10) Patent No.: US 9,071,759 B2
(45) Date of Patent: Jun. 30, 2015

(54) COMPOUND-EYE IMAGING DEVICE, AND PARALLAX ADJUSTING METHOD AND PROGRAM THEREOF

(75) Inventor: Koji Mori, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 289 days.

(21) Appl. No.: 13/260,143

(22) PCT Filed: Sep. 13, 2010

(86) PCT No.: PCT/JP2010/065764
§ 371 (c)(1),
(2), (4) Date: Sep. 23, 2011

(87) PCT Pub. No.: WO2011/121818
PCT Pub. Date: Oct. 6, 2011

(65) Prior Publication Data
US 2012/0140043 A1 Jun. 7, 2012

(30) Foreign Application Priority Data

Mar. 30, 2010 (JP) .................................. 2010-079508
Jun. 30, 2010 (JP) .................................. 2010-149858

(51) Int. Cl.
*H04N 13/02* (2006.01)
*H04N 5/232* (2006.01)
(Continued)

(52) U.S. Cl.
CPC ....... *H04N 5/23293* (2013.01); *H04N 5/23216* (2013.01); *H04N 13/0022* (2013.01); *H04N 13/0239* (2013.01); *H04N 13/0404* (2013.01); *H04N 2013/0081* (2013.01)

(58) Field of Classification Search
CPC .......... H04N 13/0022; H04N 5/23293; H04N 5/23216; H04N 13/0404; H04N 13/02391; H04N 2013/0081
USPC .......................................................... 348/47
See application file for complete search history.

(56) References Cited

U.S. PATENT DOCUMENTS 6,204,876 B1 * 3/2001 Uomori et al. .................. 348/47
6,614,927 B1 9/2003 Tabata
(Continued)

FOREIGN PATENT DOCUMENTS

JP 11-355808 A 12/1999
JP 2003-18619 A 1/2003
(Continued)

OTHER PUBLICATIONS

Extended European Search Report for Application No. 10848991.5, dated Aug. 22, 2013.
(Continued)

*Primary Examiner* — Christopher S Kelley
*Assistant Examiner* — Matthew Kwan
(74) *Attorney, Agent, or Firm* — Birch, Stewart, Kolasch & Birch, LLP

(57) ABSTRACT

A composite eye camera has: imaging sections (21A, 21B) that generate plural viewpoint images per frame by imaging a same subject from plural viewpoints; a three-dimensional processing section (30) that acquires a parallax amount on the basis of the generated plural viewpoint images; and a CPU (35) that judges that there is an abnormality in the parallax amount in at least one case among a case in which fluctuation of a fixed interval in the acquired parallax amount is greater than a predetermined value, and a case in which the parallax amount reaches a predetermined allowed limit value, and a case in which an object of acquisition of the parallax amount can no longer be detected, and judges that there is no abnormality in the parallax amount in a case that is none of these, and, when it is judged that there is no abnormality in the parallax amount, carries out first parallax adjustment, and, when it is judged that there is an abnormality in the parallax amount, switches to control of a second parallax adjustment, that is different than control of the first parallax adjustment, and carries out parallax adjustment. Accordingly, parallax adjustment is carried out appropriately even when there are problems in the parallax amount itself that is determined from the plural viewpoint images, or when an object of parallax adjustment can no longer be detected.

27 Claims, 16 Drawing Sheets

(51) Int. Cl.
*H04N 13/00* (2006.01)
*H04N 13/04* (2006.01)

(56) References Cited

U.S. PATENT DOCUMENTS

| | | |
|---|---|---|
| 2004/0057612 A1 | 3/2004 | Tabata |
| 2004/0208357 A1 | 10/2004 | Tokuhashi et al. |
| 2004/0247175 A1 | 12/2004 | Takano et al. |
| 2005/0031330 A1* | 2/2005 | Nonaka et al. ............... 396/104 |
| 2005/0253924 A1* | 11/2005 | Mashitani ...................... 348/42 |
| 2007/0296874 A1* | 12/2007 | Yoshimoto et al. ........... 348/739 |
| 2010/0007763 A1* | 1/2010 | Yokohata ................... 348/222.1 |

FOREIGN PATENT DOCUMENTS

| | | |
|---|---|---|
| JP | 2004-350918 A | 12/2004 |
| JP | 2004-363758 A | 12/2004 |
| JP | 2005-73012 A | 3/2005 |
| JP | 2007-37011 A | 2/2007 |

OTHER PUBLICATIONS

Tsang et al., "Neuromorphic Implementation of Active Gaze and Vergence Control," IEEE International Symposium on Circuits and Systems, May 18, 2008, pp. 1076-1079.

Chinese Office Action issued in Chinese Patent Application No. 201080012380.0 on Apr. 29, 2014.

* cited by examiner

FIG.17

| FIRST FRAME | LEFT EYE IMAGE | COORDINATE GROUP OF CHARACTERISTIC POINT A |
| | | COORDINATE GROUP OF DETECTED FACE A |
| | | COORDINATE GROUP OF DETECTED FACE B |
| | | ABSENCE/PRESENCE OF HUNTING |
| | | . |
| | | . |
| | RIGHT EYE IMAGE | COORDINATE GROUP OF CHARACTERISTIC POINT A' |
| | | COORDINATE GROUP OF DETECTED FACE A' |
| | | COORDINATE GROUP OF DETECTED FACE B' |
| | | ABSENCE/PRESENCE OF HUNTING |
| | | . |
| | | . |
| SECOND FRAME | LEFT EYE IMAGE | COORDINATE GROUP OF CHARACTERISTIC POINT A |
| | | COORDINATE GROUP OF DETECTED FACE A |
| | | COORDINATE GROUP OF DETECTED FACE B |
| | | ABSENCE/PRESENCE OF HUNTING |
| | | . |
| | | . |
| | RIGHT EYE IMAGE | COORDINATE GROUP OF CHARACTERISTIC POINT A' |
| | | COORDINATE GROUP OF DETECTED FACE A' |
| | | COORDINATE GROUP OF DETECTED FACE B' |
| | | ABSENCE/PRESENCE OF HUNTING |
| | | . |
| | | . |
| . . . | . . . | . . . |
| nTH FRAME | LEFT EYE IMAGE | COORDINATE GROUP OF CHARACTERISTIC POINT A |
| | | COORDINATE GROUP OF DETECTED FACE A |
| | | COORDINATE GROUP OF DETECTED FACE B |
| | | ABSENCE/PRESENCE OF HUNTING |
| | | . |
| | | . |
| | RIGHT EYE IMAGE | COORDINATE GROUP OF CHARACTERISTIC POINT A' |
| | | COORDINATE GROUP OF DETECTED FACE A' |
| | | COORDINATE GROUP OF DETECTED FACE B' |
| | | ABSENCE/PRESENCE OF HUNTING |
| | | . |
| | | . |

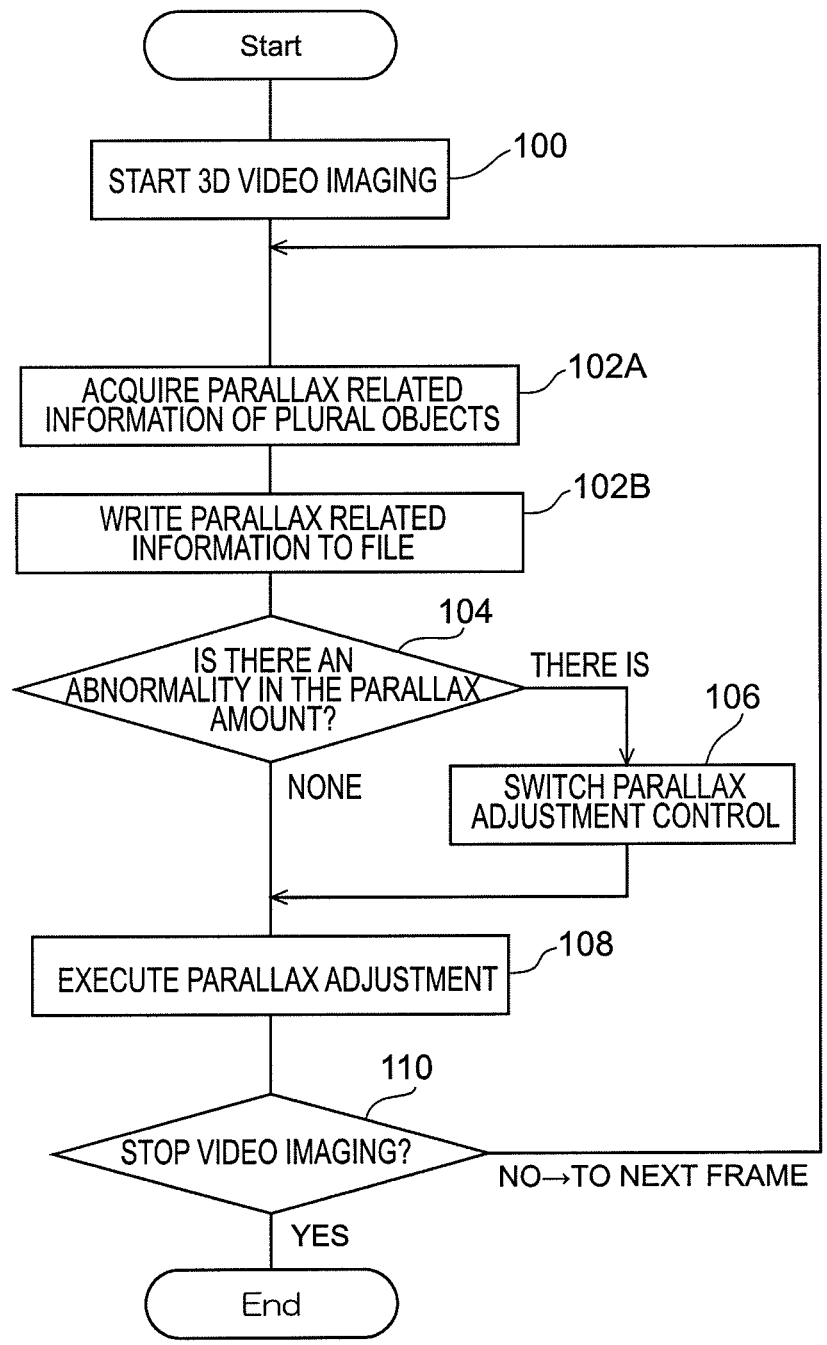

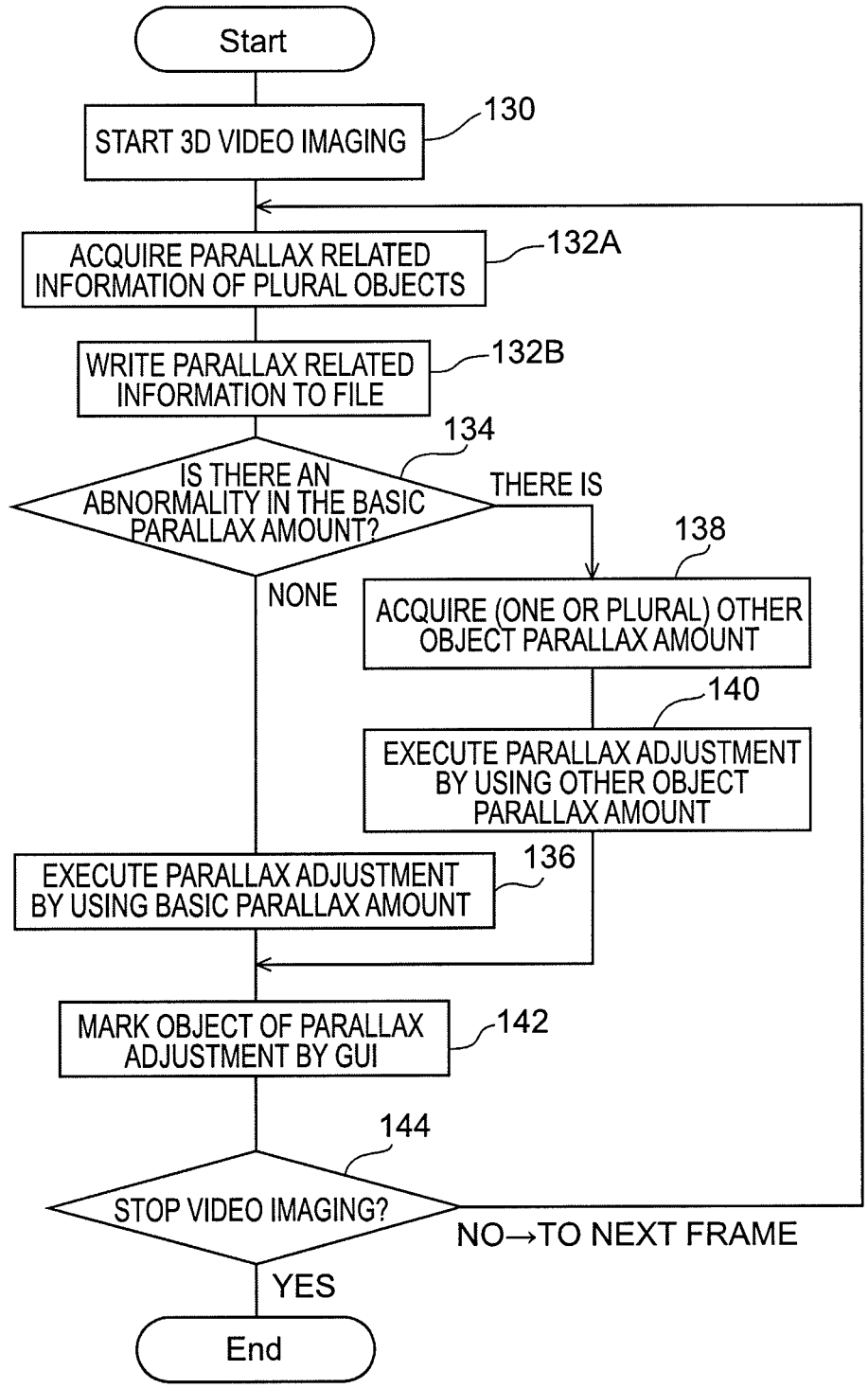

COMPOUND-EYE IMAGING DEVICE, AND PARALLAX ADJUSTING METHOD AND PROGRAM THEREOF

TECHNICAL FIELD

The present invention relates to a compound-eye imaging device, and a parallax adjusting method and program thereof.

BACKGROUND TECHNOLOGY

There is conventionally proposed a compound-eye imaging device that has plural imaging sections and generates a stereoscopic image. The compound-eye imaging device generates the stereoscopic image on the basis of plural viewpoint images that are generated by the plural imaging sections respectively, and displays the stereoscopic image on a monitor for stereoscopic display.

The stereoscopic feel of the stereoscopic image that is imaged at the compound-eye imaging device depends on distance between the both eyes of the user and the distance from the monitor for stereoscopic viewing to the user, and therefore, there is the problem that, with regard to the stereoscopic function of the compound-eye imaging device, differences between individuals are great. Thus, in a compound-eye imaging device, the parallax of the plural viewpoint images can be adjusted in accordance with operation of the user, and the stereoscopic feel of the stereoscopic image is thereby adjusted.

Thus, there is disclosed a technique of carrying out parallax amount adjustment that suits the intentions of the user who carried out the parallax amount adjustment initially, regardless of the type of the display that displays the stereoscopic image (see Patent Document 1).

In the technique of Patent Document 1, information relating to adjustment of the parallax amount is created on the basis of a request to change the parallax amount, and this is converted into information of a unit that does not depend on the type of the display, and is recorded. Then, when the recorded information is read-out, information relating to adjustment of the parallax amount is created on the basis of this information, and an image for stereoscopic display is generated on the basis of this information.

Further, there is disclosed a technique that records picked-up image data for stereoscopic display, by a method that has good versatility and convenience (see Patent Document 2).

In the technique of Patent Document 2, parallax information of one reference image data and parallax image data is extracted from plural picked-up image data for stereoscopic display, and difference image data is generated. Then, the difference image data is added to the reference image data, and further, addition identification information, that expresses that the difference image data has been added, is added to the header region of the file.

Patent Document 1: Japanese Patent Application Laid-Open No. 2005-73012
Patent Document 2: Japanese Patent Application Laid-Open No. 2004-363758

DISCLOSURE OF THE INVENTION

Problems to be Solved by the Invention

However, when there are problems in the initial stage, e.g., when there are problems with the parallax amount itself that is determined from the plural viewpoint images obtained by the imaging sections, or when the object of parallax adjustment can no longer be detected, there is the problem that parallax adjustment cannot be carried out appropriately even if the techniques of Patent Documents 1 and 2 are used.

The present invention is proposed in view of these circumstances, and an object thereof is to provide a compound-eye imaging device, and a parallax adjusting method and program thereof, that can carry out parallax adjustment appropriately even when there are problems with the parallax amount itself that is determined from plural viewpoint images or when the object of parallax adjustment can no longer be detected.

The compound-eye imaging device according to one embodiment has: imaging sections that generate a plurality of viewpoint images per frame by imaging a same subject from a plurality of viewpoints; a parallax amount acquiring section that acquires a parallax amount on the basis of the plurality of viewpoint images generated by the imaging sections; an abnormality judging section that judges that there is an abnormality in the parallax amount in at least one case of a case in which fluctuation of a fixed interval in the parallax amount acquired by the parallax amount acquiring section is greater than a predetermined value, a case in which the parallax amount reaches an allowed limit value that is determined in advance, or a case in which an object of acquisition of the parallax amount can no longer be detected, and judges that there is no abnormality in the parallax amount in a case that is none of a case in which fluctuation of a fixed interval in the parallax amount is greater than a predetermined value, a case in which the parallax amount reaches an allowed limit value that is determined in advance, or a case in which an object of acquisition of the parallax amount can no longer be detected; and a parallax adjusting section that, when it is judged by the abnormality judging section that there is no abnormality in the parallax amount, carries out first parallax adjustment, and that, when it is judged by the abnormality judging section that there is an abnormality in the parallax amount, switches to control of a second parallax adjustment that is different than control of the first parallax adjustment, and carries out parallax adjustment.

In the compound-eye imaging device when it is judged by the abnormality judging section that there is an abnormality in the parallax amount, the parallax adjusting section carries out parallax adjustment within a range of a parallax amount maximum change amount that is determined in advance.

Also, in the compound-eye imaging device when it is judged by the abnormality judging section that there is an abnormality in the parallax amount, the parallax adjusting section carries out parallax adjustment by using a parallax amount of a previous frame.

Also, in the compound-eye imaging device when it is judged by the abnormality judging section that there is an abnormality in the parallax amount, the parallax adjusting section lowers a parallax adjustment frequency.

The compound-eye imaging device further comprises an associating section that associates at least one information of information that is obtained from the plurality of viewpoint images generated by the imaging sections and that is used for acquiring the parallax amount at the parallax amount acquiring section, and information that expresses the parallax amount acquired by the parallax amount acquiring section by using the information obtained from the plurality of viewpoint images, or information expressing whether or not a predetermined processing has been carried out by using the parallax amount, with the plurality of viewpoint images that correspond to the at least one information and on which parallax adjustment has been carried out.

In the compound-eye imaging device the associating section associates the at least one information with the plurality of viewpoint images that correspond to the at least one information and on which parallax adjustment has been carried out, and collects the at least one information in one electronic file.

The compound-eye imaging device according to another embodiment has: imaging sections that generate a plurality of viewpoint images per frame by imaging a same subject from a plurality of viewpoints; a parallax amount acquiring section that acquires a parallax amount of a predetermined object on the basis of the plurality of viewpoint images generated by the imaging sections; an abnormality judging section that judges that there is an abnormality in the parallax amount in at least one case of a case in which fluctuation of a fixed interval in the parallax amount acquired by the parallax amount acquiring section is greater than a predetermined value, a case in which the parallax amount reaches an allowed limit value that is determined in advance, or a case in which an object of acquisition of the parallax amount can no longer be detected, and judges that there is no abnormality in the parallax amount in a case that is none of a case in which fluctuation of a fixed interval in the parallax amount is greater than a predetermined value, a case in which the parallax amount reaches an allowed limit value that is determined in advance, or a case in which an object of acquisition of the parallax amount can no longer be detected; and a parallax adjusting section that, when it is judged by the abnormality judging section that there is no abnormality in the parallax amount, carries out parallax adjustment of the predetermined object, and that, when it is judged by the abnormality judging section that there is an abnormality in the parallax amount, carries out parallax adjustment on another object that is different than the predetermined object.

In the compound-eye imaging device the parallax adjusting section makes an object, which has a closest distance to the predetermined object in a direction orthogonal to an image plane of the viewpoint images, be the other object.

Also, in the compound-eye imaging device the parallax adjusting section makes an object, which has a closest distance to the predetermined object in an image plane of the viewpoint images, be the other object.

The compound-eye imaging device further comprises an associating section that associates at least one information of information that is obtained from the plurality of viewpoint images generated by the imaging sections and that is used for acquiring the parallax amount at the parallax amount acquiring section, and information that expresses the parallax amount acquired by the parallax amount acquiring section by using the information obtained from the plurality of viewpoint images, or information expressing whether or not a predetermined processing has been carried out by using the parallax amount, with the predetermined object or the other object that corresponds to the at least one information and on which parallax adjustment has been carried out.

In the compound-eye imaging device the associating section associates the at least one information with the predetermined object or the other object that corresponds to the at least one information and on which parallax adjustment has been carried out, and collects the at least one information in one electronic file.

The parallax adjusting method of a compound-eye imaging device according to another embodiment includes: acquiring a parallax amount on the basis of a plurality of viewpoint images generated by imaging sections that generate the plurality of viewpoint images per frame by imaging a same subject from a plurality of viewpoints; judging that there is an abnormality in the parallax amount in at least one case of a case in which fluctuation of a fixed interval in the acquired parallax amount is greater than a predetermined value, a case in which the parallax amount reaches an allowed limit value that is determined in advance, or a case in which an object of acquisition of the parallax amount can no longer be detected, and judging that there is no abnormality in the parallax amount in a case that is none of a case in which fluctuation of a fixed interval in the parallax amount is greater than a predetermined value, a case in which the parallax amount reaches an allowed limit value that is determined in advance, or a case in which an object of acquisition of the parallax amount can no longer be detected; and when it is judged that there is no abnormality in the parallax amount, carrying out first parallax adjustment, and, when it is judged that there is an abnormality in the parallax amount, switching to control of a second parallax adjustment that is different than control of the first parallax adjustment, and carrying out parallax adjustment.

The parallax adjusting method of a compound-eye imaging device according to another embodiment includes: acquiring a parallax amount of a predetermined object on the basis of a plurality of viewpoint images generated by imaging sections that generate the plurality of viewpoint images per frame by imaging a same subject from a plurality of viewpoints; judging that there is an abnormality in the parallax amount in at least one case of a case in which fluctuation of a fixed interval in the acquired parallax amount is greater than a predetermined value, a case in which the parallax amount reaches an allowed limit value that is determined in advance, or a case in which an object of acquisition of the parallax amount can no longer be detected, and judging that there is no abnormality in the parallax amount in a case that is none of a case in which fluctuation of a fixed interval in the parallax amount is greater than a predetermined value, a case in which the parallax amount reaches an allowed limit value that is determined in advance, or a case in which an object of acquisition of the parallax amount can no longer be detected; and when it is judged that there is no abnormality in the parallax amount, carrying out parallax adjustment of the predetermined object, and, when it is judged that there is an abnormality in the parallax amount, carrying out parallax adjustment on another object that is different than the predetermined object.

The parallax adjusting program of a compound-eye imaging device including computer-readable instructions in another embodiment is for causing a computer to function as: a parallax amount acquiring section that acquires a parallax amount on the basis of a plurality of viewpoint images generated by imaging sections that generate the plurality of viewpoint images per frame by imaging a same subject from a plurality of viewpoints; an abnormality judging section that judges that there is an abnormality in the parallax amount in at least one case of a case in which fluctuation of a fixed interval in the parallax amount acquired by the parallax amount acquiring section is greater than a predetermined value, a case in which the parallax amount reaches an allowed limit value that is determined in advance, a case in which an object of acquisition of the parallax amount can no longer be detected, and judges that there is no abnormality in the parallax amount in a case that is none of a case in which fluctuation of a fixed interval in the parallax amount is greater than a predetermined value, a case in which the parallax amount reaches an allowed limit value that is determined in advance, or a case in which an object of acquisition of the parallax amount can no longer be detected; and a parallax adjusting section that, when it is judged by the abnormality judging section that there is no abnormality in the parallax amount, carries out first parallax adjustment, and that, when it is judged by the abnormality judging section that there is an abnormality in the parallax amount, switches to control of a second parallax adjustment that is different than control of the first parallax adjustment, and carries out parallax adjustment.

The parallax adjusting program of a compound-eye imaging device including computer-readable instructions according to another embodiment is for causing a computer to function as: a parallax amount acquiring section that acquires a parallax amount of a predetermined object on the basis of a plurality of viewpoint images generated by imaging sections that generate the plurality of viewpoint images per frame by imaging a same subject from a plurality of viewpoints; an abnormality judging section that judges that there is an abnormality in the parallax amount in at least one case of a case in which fluctuation of a fixed interval in the parallax amount acquired by the parallax amount acquiring section is greater than a predetermined value, a case in which the parallax amount reaches an allowed limit value that is deter nined in advance, or a case in which an object of acquisition of the parallax amount can no longer be detected, and judges that there is no abnormality in the parallax amount in a case that is none of a case in which fluctuation of a fixed interval in the parallax amount is greater than a predetermined value, a case in which the parallax amount reaches an allowed limit value that is determined in advance, or a case in which an object of acquisition of the parallax amount can no longer be detected; and a parallax adjusting section that, when it is judged by the abnormality judging section that there is no abnormality in the parallax amount, carries out parallax adjustment of the predetermined object, and that, when it is judged by the abnormality judging section that there is an abnormality in the parallax amount, carries out parallax adjustment on another object that is different than the predetermined object.

Effects of the Invention

In accordance with the present invention, the parallax amount is acquired on the basis of plural viewpoint images per frame, and it is judged that there is an abnormality in the parallax amount in at least one case among a case in which fluctuation of a fixed interval in the acquired parallax amount is greater than a predetermined value, and a case in which the acquired parallax amount reaches an allowed limit value that is determined in advance, and a case in which an object of acquisition of the parallax amount can no longer be detected. Further, it is judged that there is no abnormality in the parallax amount in a case that is none of a case in which fluctuation of a fixed interval in the parallax amount is greater than a predetermined value, and a case in which the parallax amount reaches an allowed limit value that is determined in advance, and a case in which an object of acquisition of the parallax amount can no longer be detected. Then, when it is judged that there is no abnormality in the parallax amount, first parallax adjustment is carried out, and, when it is judged that there is an abnormality in the parallax amount, control of a second parallax adjustment, that is different than control of the first parallax adjustment, is switched to, and parallax adjustment is carried out. Accordingly, even when there is an abnormality in the parallax amount, parallax amount adjustment can be stabilized.

Further, in accordance with the present invention, the parallax amount of a predetermined object is acquired on the basis of plural viewpoint images per frame, and it is judged that there is an abnormality in the parallax amount in at least one case among a case in which fluctuation of a fixed interval in the acquired parallax amount is greater than a predetermined value, and a case in which the acquired parallax amount reaches an allowed limit value that is determined in advance, and a case in which an object of acquisition of the parallax amount can no longer be detected. Further, it is judged that there is no abnormality in the parallax amount in a case that is none of a case in which fluctuation of a fixed interval in the parallax amount is greater than a predetermined value, and a case in which the parallax amount reaches an allowed limit value that is determined in advance, and a case in which an object of acquisition of the parallax amount can no longer be detected. Then, when it is judged that there is no abnormality in the parallax amount, parallax adjustment of the predetermined object is carried out, and, when it is judged that there is an abnormality in the parallax amount, parallax adjustment is carried out on another object that is different than the predetermined object. Accordingly, even when there is an abnormality in the parallax amount of the predetermined object, parallax amount adjustment can be stabilized by adjusting the parallax amount of the other object.

BRIEF DESCRIPTION OF THE DRAWINGS

FIG. 17 is a diagram showing an example of parallax related information.

FIG. 19 is a flowchart showing a fourth parallax adjusting routine.

FIG. 21 is a flowchart showing a sixth parallax adjusting routine.

BEST FORMS FOR EMBODYING THE INVENTION

[First Embodiment]

Figure 1:
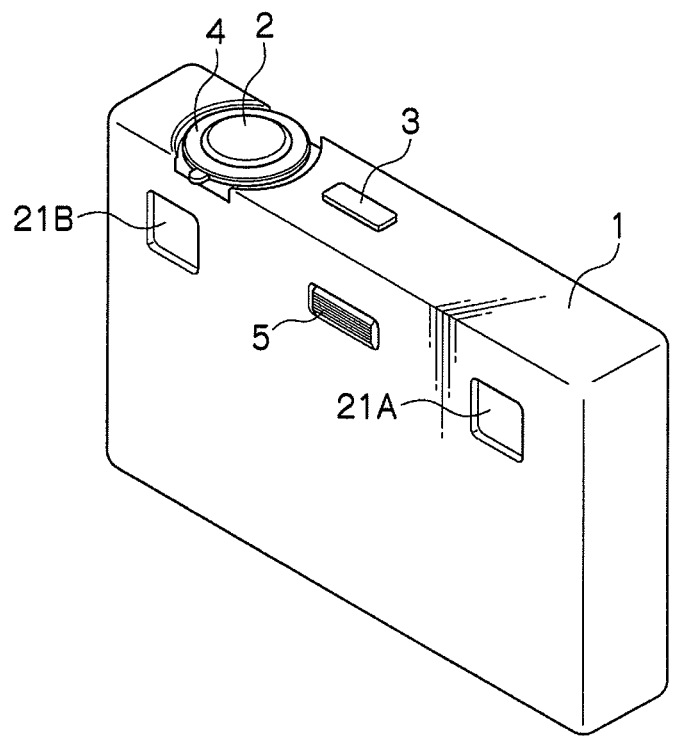
FIG. 1 is a front perspective view of a compound-eye camera relating to embodiments of the present invention.
Figure 2:
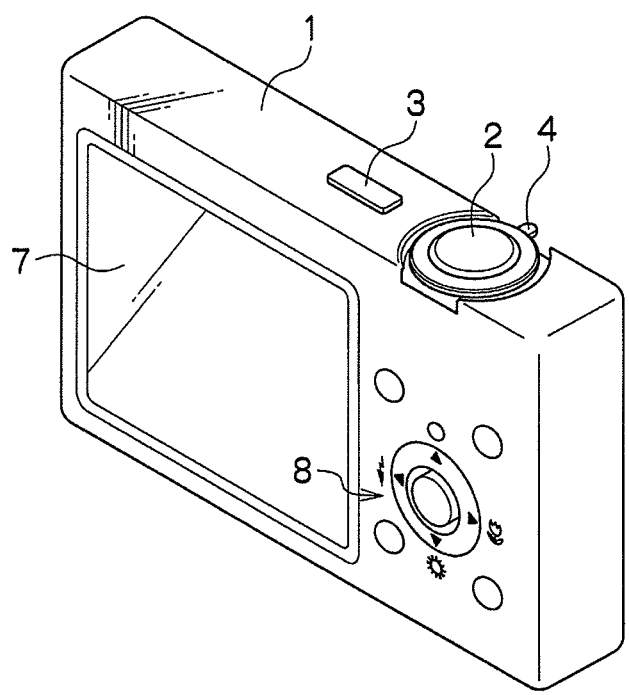
FIG. 2 is a rear perspective view of the compound-eye camera.

Embodiments of the present invention are described hereinafter with reference to the drawings. FIG. 1 is a front perspective view of a compound-eye camera 1 relating to the embodiments of the present invention, and FIG. 2 is a rear perspective view.

A release button 2, a power button 3 and a zoom lever 4 are provided at the top portion of the compound-eye camera 1. A flash 5 and the lenses of two imaging sections 21A, 21B are disposed at the front surface of the compound-eye camera 1. Further, a liquid crystal monitor (hereinafter simply called "monitor") 7 that carries out various types of display, and various types of operation buttons 8 are disposed at the rear surface of the compound-eye camera 1.

Figure 3:
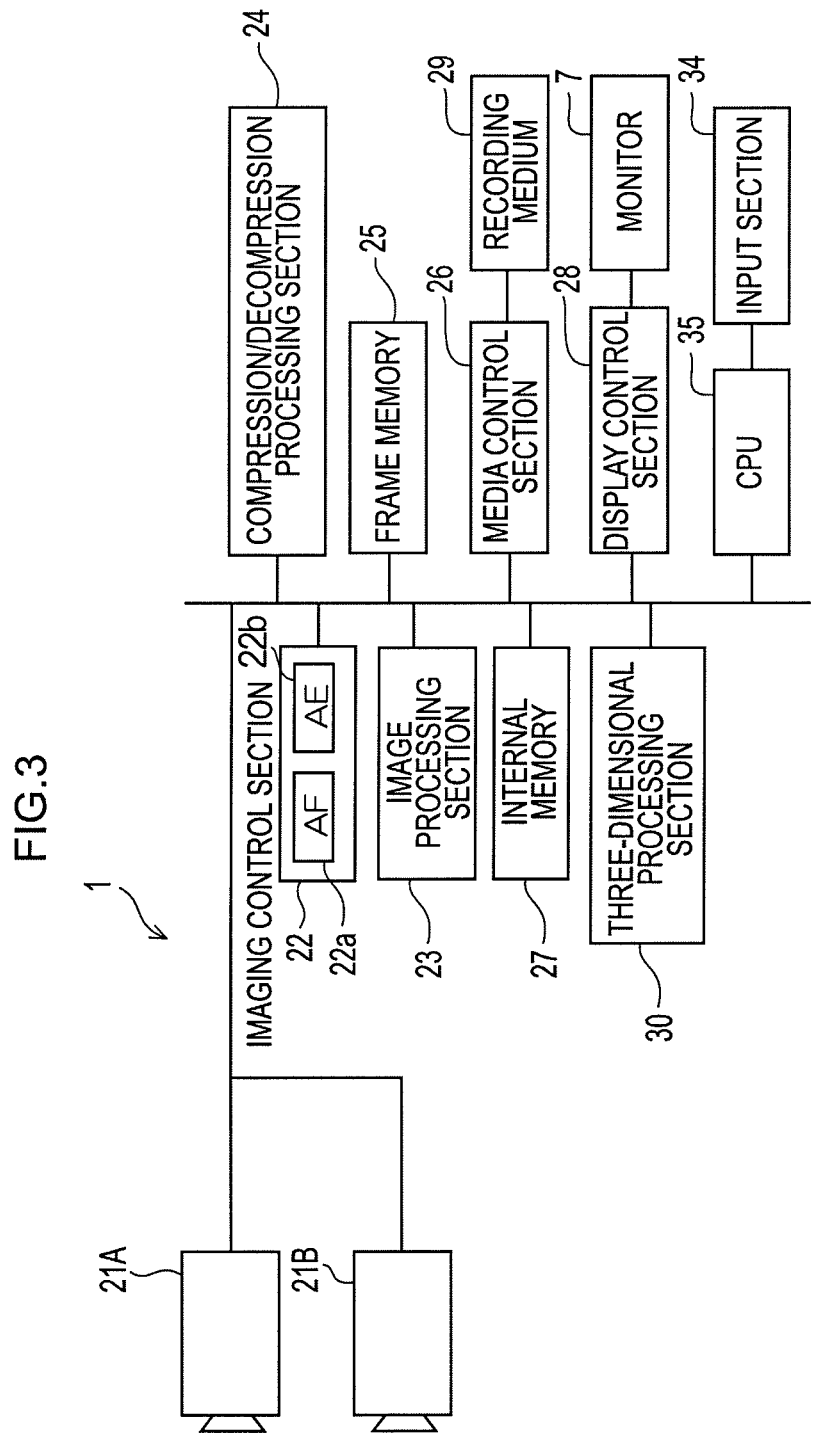
FIG. 3 is a schematic block diagram showing the internal structure of the compound-eye camera.

FIG. 3 is a schematic block diagram showing the internal structure of the compound-eye camera 1. The compound-eye camera 1 has the two imaging sections 21A, 21B, an imaging control section 22, an image processing section 23, a compression/decompression processing section 24, a frame memory 25, a media control section 26, an internal memory 27, a display control section 28, and a CPU 35. Note that the imaging sections 21A, 21B have a convergence angle at which the subject is viewed, and are disposed such that there is a predetermined baseline length. Further, the information of the convergence angle and the baseline length is stored in the internal memory 27.

Figure 4:
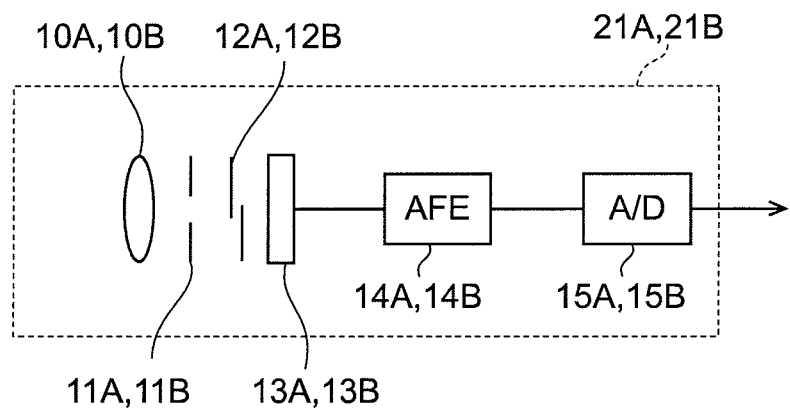
FIG. 4 is a diagram showing the structure of an imaging section.

FIG. 4 is a drawing showing the structure of the imaging sections 21A, 21B. As shown in FIG. 4, the imaging section 21A, 21B has a lens 10A, 10B, a diaphragm 11A, 11B, a shutter 12A, 12B, an imaging element 13A, 13B, an analog front end (AFE) 14A, 14B, and an A/D converting section 15A, 15B, respectively.

The lens 10A, 10B has plural lenses having different functions, such as a focus lens for focusing on the subject, a zoom lens for realizing the zoom function, and the like. The position of the lens 10A, 10B is adjusted by an unillustrated lens driving section on the basis of focus data obtained from an AF processing section 22a of the imaging control section 22, and zoom data that is obtained when the zoom lever 4 shown in FIG. 1 and FIG. 2 is operated.

With respect to the diaphragm 11A, 11B, adjustment of the diaphragm diameter is carried out by an unillustrated diaphragm driving section on the basis of diaphragm value data obtained by an AE processing section 22b of the imaging control section 22.

The shutter 12A, 12B is a mechanical shutter, and is driven by an unillustrated shutter driving section in accordance with a shutter speed obtained from the AE processing section 22b.

The imaging element 13A, 13B has a photoelectric surface at which numerous light-receiving elements are arrayed two-dimensionally. The subject light is imaged on this photoelectric surface and photoelectrically converted, and an analog imaging signal is acquired. Further, a color filter, in which filters of the respective colors of R, G, B are arrayed orderly, is disposed at the front surface of the imaging element 13A, 13B.

The AFE 14A, 14B carries out, on the analog imaging signal outputted from the imaging element 13A, 13B, processing that removes noise of the analog imaging signal, and processing that adjusts the gain of the analog imaging signal (hereinafter called "analog processings").

The A/D converting section 15A, 15B converts, into a digital signal, the analog imaging signal that was subjected to the analog processings by the AFE 14A, 14B. Note that the image expressed by the digital image data acquired from the imaging section 21A is first image G1, and the image expressed by the image data acquired from the imaging section 21B is second image G2.

As described above, the imaging control section 22 has the AF control section 22a and the AE processing section 22b. When the release button 2 is halfway push-operated, the AF processing section 22a acquires distance-measuring information from a distance-measuring sensor, and determines the focal point positions of the lenses 10A, 10B, and outputs them to the imaging sections 21A, 21B. The AE processing section 22b determines the diaphragm value and the shutter speed on the basis of a pre-image, and outputs them to the imaging sections 21A, 21B.

Note that the method of detecting the focal point positions by the AF processing section 22a is not limited to an active method using a distance-measuring information, and a passive method that detects the focus positions by using the contrasts of the images may be used.

The imaging control section 22 controls the imaging sections 21A, 21B such that, in the state in which the release button 2 is not operated, through-images, that have fewer pixels than the actual images of the first and second images G1, G2 and are for confirming the imaging range, are successively generated at a predetermined time interval (e.g., an interval of 1/30 second). Then, when the release button 2 is fully press-operated, the imaging control section 22 controls the imaging sections 21A, 21B to generate the actual images of the first and second images G1, G2 in order to start the actual imaging.

The above explanation is the case of a static image mode, but, in the present embodiment, setting to a video imaging mode is also possible. In the case of the video imaging mode, when the release button 2 is pushed, video imaging is started, and the first and second images G1, G2 are generated per frame, and, when the release button 2 is pressed again, the video imaging stops.

The image processing section 23 carries out image processings such as white balance adjustment, gradation correction, sharpness correction, and color correction and the like on the digital image data of the first and second images G1, G2 that the imaging sections 21A, 21B have acquired.

The compression/decompression processing section 24 carries out compression processing in a compression format such as, for example, JPEG or the like, on the image data expressing the actual images of the first and second images G1, G2 that have been subjected to processing by the image processing section 23, and generates an image file F0 for stereoscopic viewing. This image file F0 for stereoscopic viewing has the image data of the first and second images G1, G2, and further includes accessory information that is based on Exif format or the like, such as the baseline length, the convergence angle, the imaging date and time and the like, and viewpoint information expressing the viewpoint position.

Figure 5:
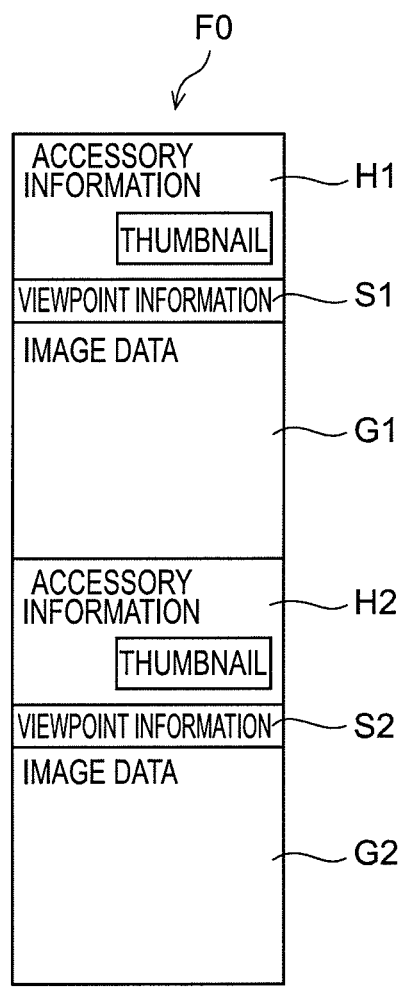
FIG. 5 is a diagram showing the file format of an image file of a stereoscopic image.

FIG. 5 is a diagram showing the file format of the image file for stereoscopic viewing. Accessory information H1 of the first image G1, viewpoint information S1 of the first image G1, image data of the first image G1, accessory information H2 of the second image G2, viewpoint information S2 of the second image G2, and image data of the second image G2 are stored in the image file F0 for stereoscopic viewing. Further, although not illustrated, information expressing the start position and the end position of the data are included before and after the accessory information, the viewpoint information and the image data of the first and second images G1, G2 of the image file F0 for stereoscopic viewing.

Information of the imaging date, the baseline length, and the convergence angle of the first and second images G1, G2 is included in the accessory information H1, H2. Thumbnail images of the first and second images G1, G2 also are included in the accessory information H1, H2. Note that, for example, the number of the viewpoint position that is given in order from the imaging section at the left side can be used as the viewpoint information.

The frame memory 25 is a memory for work that is used when carrying out various types of processings, including the processings that the aforementioned image processing section 23 carries out, on the image data expressing the first and second images G1, G2 that the imaging sections 21A, 21B acquired.

The media control section 26 carries out control of accessing a recording medium 29 and writing and reading image files and the like.

The internal memory 27 stores various types of constants that are set at the composite eye camera 1, and programs that the CPU 35 executes, and the like.

In the case of stereoscopic viewing, the display control section 28 displays, on the monitor 7, a stereoscopic image GR that is recorded in the frame memory 25 or the recording medium 29.

Figure 6:
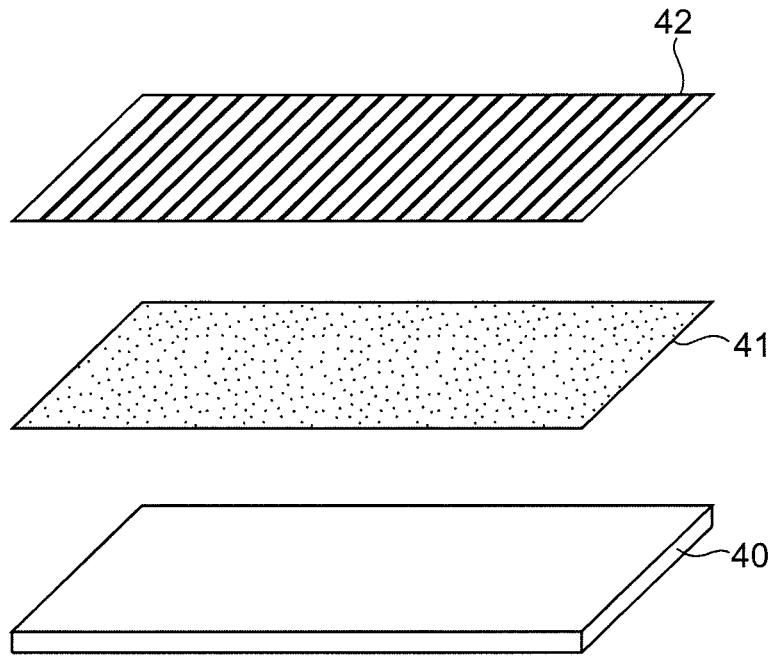
FIG. 6 is a drawing showing the structure of a monitor.

FIG. 6 is an exploded perspective view showing the structure of the monitor 7. As shown in FIG. 6, the monitor 7 is structured by layering a backlight unit 40, that emits light from LEDs, and a liquid crystal panel 41, that is for carrying out various types of display, and mounting a lenticular sheet 42 to the obverse of the liquid crystal panel 41.

Figure 7:
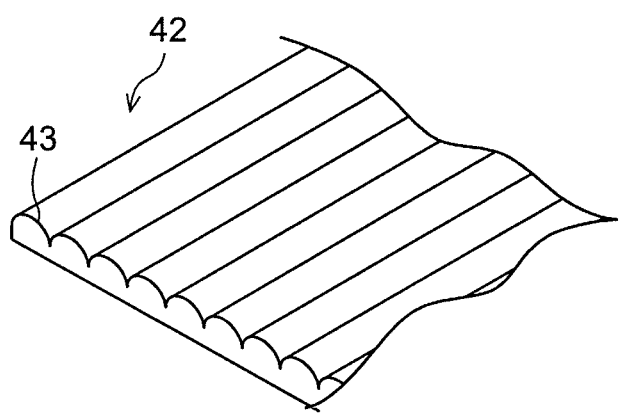
FIG. 7 is a drawing showing the structure of a lenticular sheet.

FIG. 7 is a drawing showing the structure of the lenticular sheet. As shown in FIG. 7, the lenticular sheet 42 is structured by lining-up plural cylindrical lenses 43 in parallel in a direction running along the baseline.

Further, the composite eye camera 1 has a three-dimensional processing section 30. In order to stereoscopically display the first and second images G1, G2 on the monitor 7, the three-dimensional processing section 30 carries out three-dimensional processing on the first and second images G1, G2, and generates the stereoscopic image GR.

Figure 8:
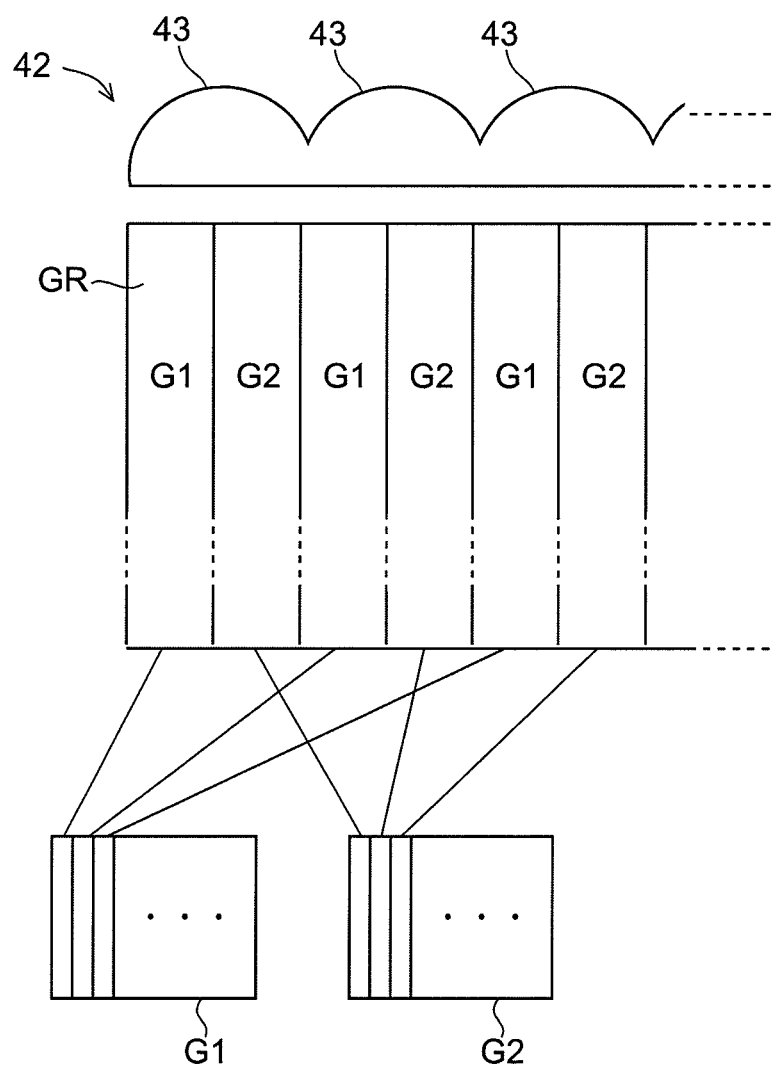
FIG. 8 is a diagram for explaining three-dimensional processing with respect to first and second images.

FIG. 8 is a diagram for explaining three-dimensional processing with respect to the first and second images G1, G2. As shown in FIG. 8, the three-dimensional processing section 30 carries out the three-dimensional processing of cutting the first and second images G1, G2 out respectively in strip shapes in the direction perpendicular to the baseline, and alternately disposing, with respect to the respective cylindrical lenses 43 at the lenticular sheet 42, the first and second images G1, G2, that have been cut-out in strip shapes and whose positions correspond, and generates the stereoscopic image GR. The image pairs of the first and second images G1, G2 that structure the stereoscopic image GR are each disposed so as to correspond to one cylindrical lens.

Further, the three-dimensional processing section 30 can also adjust the parallax of the first and second images G1, G2. Here, parallax means the offset amount in the pixel position in the lateral direction of the first and second images G1, G2, i.e., the direction along the baseline, of a subject that is included in both the first and second images G1, G2. By adjusting the parallax, the stereoscopic feel of the subject that is included in the stereoscopic image GR can be made to be an appropriate feel.

Moreover, the three-dimensional processing section 30 may adjust in real time the parallax of the first and second images G1, G2 obtained at the imaging sections 21A, 21B, or may adjust the parallax of the first and second images G1, G2 that are recorded in advance on the recording medium 29.

In the composite eye camera 1 that is structured as described above, the following first or second parallax adjusting routine is executed. Note that the programs of the first and second parallax adjusting routines are stored in advance in the internal memory 27.

(First Parallax Adjusting Routine)

Figure 9:
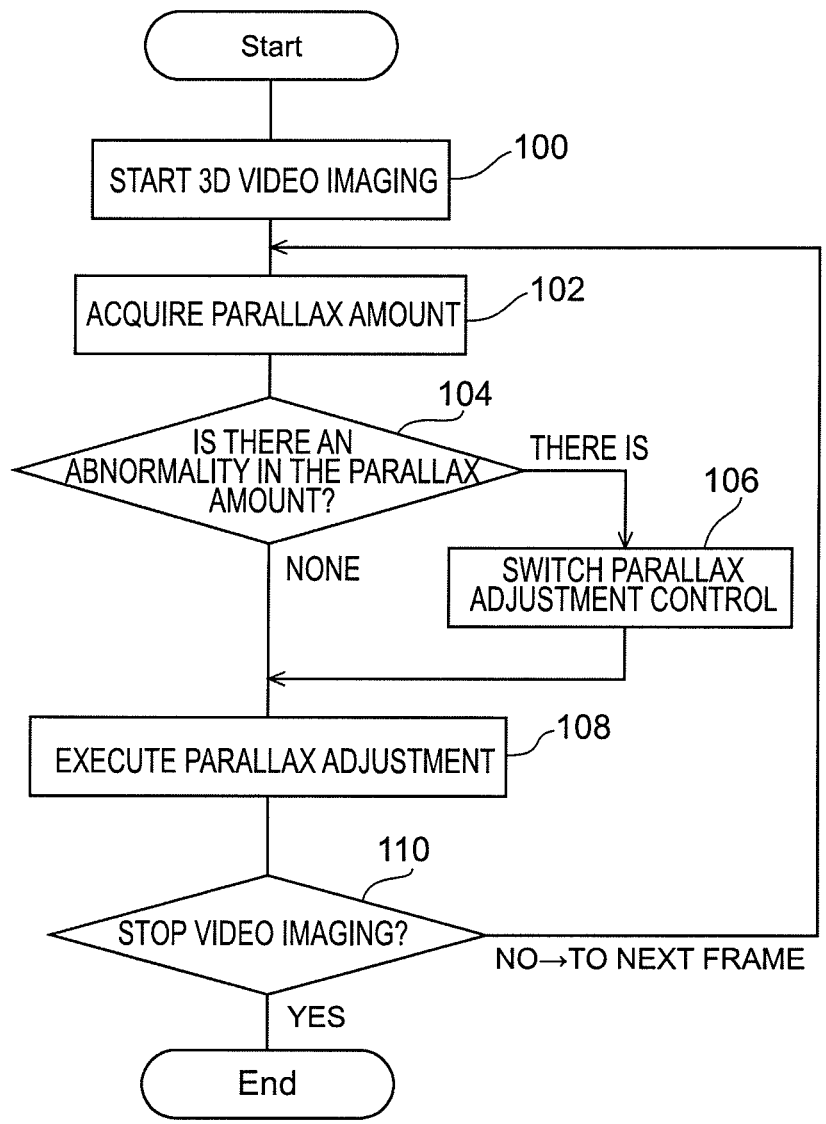
FIG. 9 is a flowchart showing a first parallax adjusting routine.

FIG. 9 is a flowchart showing the first parallax adjusting routine.

In step 100, when an instruction to start video imaging is inputted via the release button 2, the CPU 35 starts three-dimensional video imaging, and the routine proceeds to step 102.

In step 102, the CPU 35 causes the three-dimensional processing section 30 to acquire a parallax amount that is based on the first and second images G1, G2 acquired at the imaging sections 21A, 21B. Here, a first or second parallax amount acquiring routine is executed, and the three-dimensional processing section 30 carries out the following processing.

(Acquiring of Parallax Amount)

Figure 10:
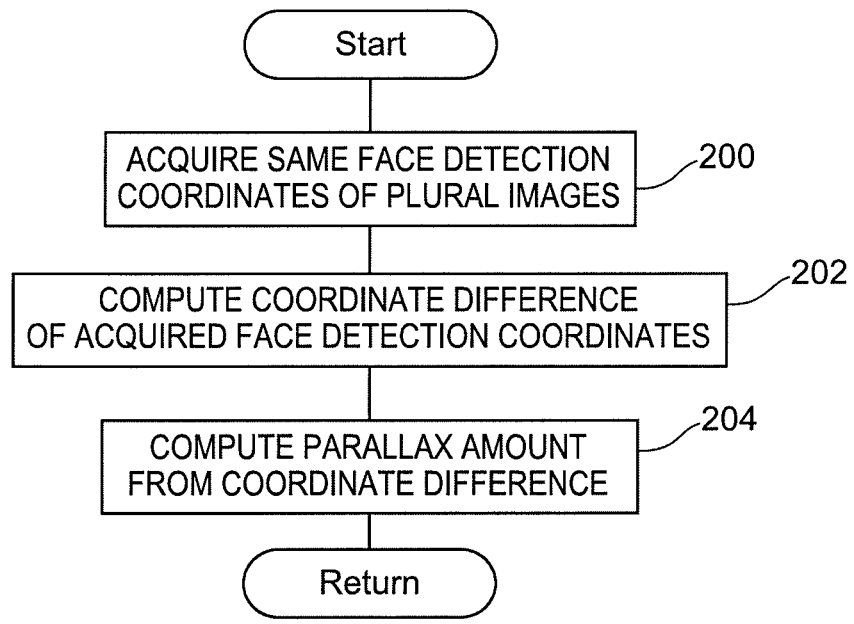
FIG. 10 is a flowchart showing a first parallax amount acquiring routine.

FIG. 10 is a flowchart showing a first parallax amount acquiring routine. Initially, the three-dimensional processing section 30 respectively detects the face region of a same person from plural images, i.e., the first and second images G1, G2 acquired at the imaging sections 21A, 21B, and acquires face detection coordinates that express the coordinates of these face regions (step 200), and computes a coordinate difference of the acquired face detection coordinates (step 202), and computes a parallax amount from the coordinate difference (step 204).

Figure 11:
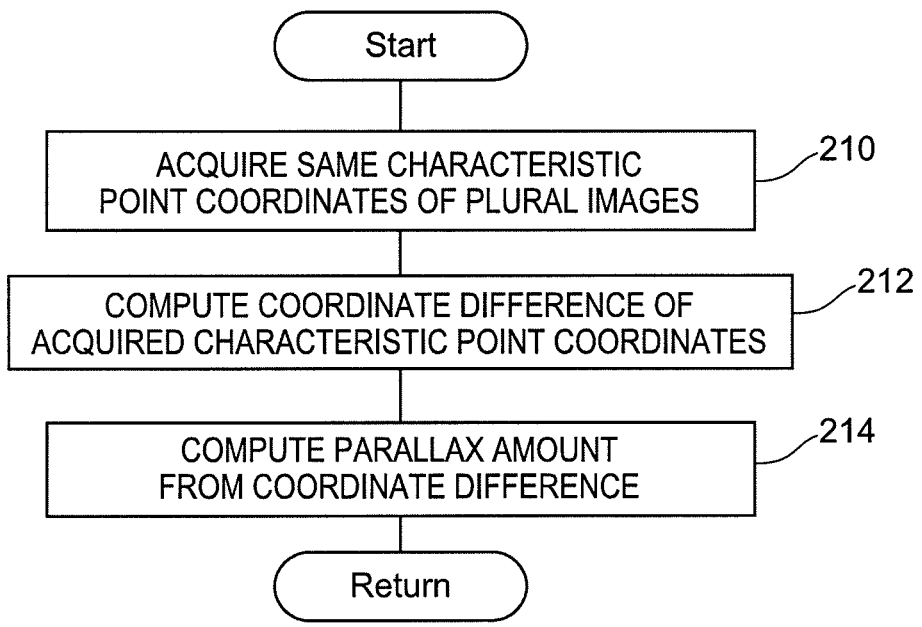
FIG. 11 is a flowchart showing a second parallax amount acquiring routine.

FIG. 11 is a flowchart showing a second parallax amount acquiring routine. Initially, the three-dimensional processing section 30 respectively detects a same object from plural images, i.e., the first and second images G1, G2 acquired at the imaging sections 21A, 21B, and acquires characteristic point coordinates that are the coordinates of characteristic points that specify these objects (step 210), and computes the coordinate difference of the acquired characteristic point coordinates (step 212), and computes a parallax amount from the coordinate difference (step 214). Then, when the first or second parallax amount acquiring routine ends, the routine moves on to step 104 shown in FIG. 9.

(Judgment as to Abnormality of Parallax Amount)

In step 104, the CPU 35 judges whether or not there is an abnormality in the parallax amount acquired at the three-dimensional processing section 30. When it is judged that there is an abnormality, the CPU 35 proceeds to step 106, and when it is judged that there is no abnormality, the CPU 35 proceeds to step 108. Here, abnormalities of the parallax amount are judged on the basis of any one of (1) whether or not there is hunting in the parallax amount, (2) whether the parallax amount is the allowed limit, and (3) whether the object of parallax adjustment has been lost track of and can no longer be detected.

(1) Judgment as to Absence/Presence of Hunting

In step 104, the CPU 35 executes a first or second hunting absence/presence judging routine that are shown next. Note that the programs of the first and second hunting absence/presence judging routines are stored in advance in the internal memory 27.

Figure 12:
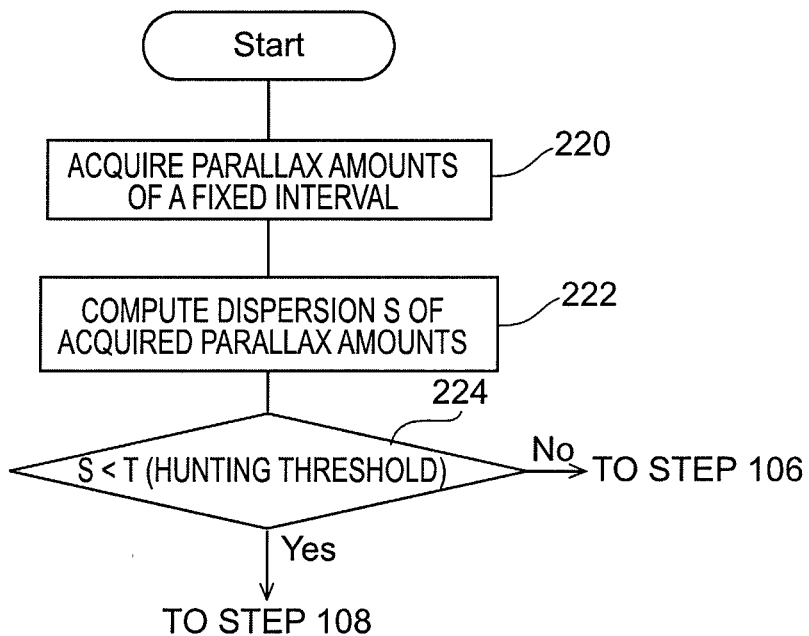
FIG. 12 is a flowchart showing a first hunting absence/presence judging routine.

FIG. 12 is a flowchart showing the first hunting absence/presence judging routine. The CPU 35 acquires parallax amounts of a fixed interval obtained at the three-dimensional processing section 30 (step 220), and computes dispersion S of the acquired parallax amounts (step 222). Then, the CPU 35 judges whether the dispersion S is smaller than a hunting threshold value T (S<T) (step 224). When S<T, the CPU 35 judges that there is no hunting (there is no abnormality in the parallax amount), and proceeds to step 108 of FIG. 9. When S is not <T, the CPU 35 judges that there is hunting (there is an abnormality in the parallax amount), and proceeds to step 106 of FIG. 9.

Figure 13:
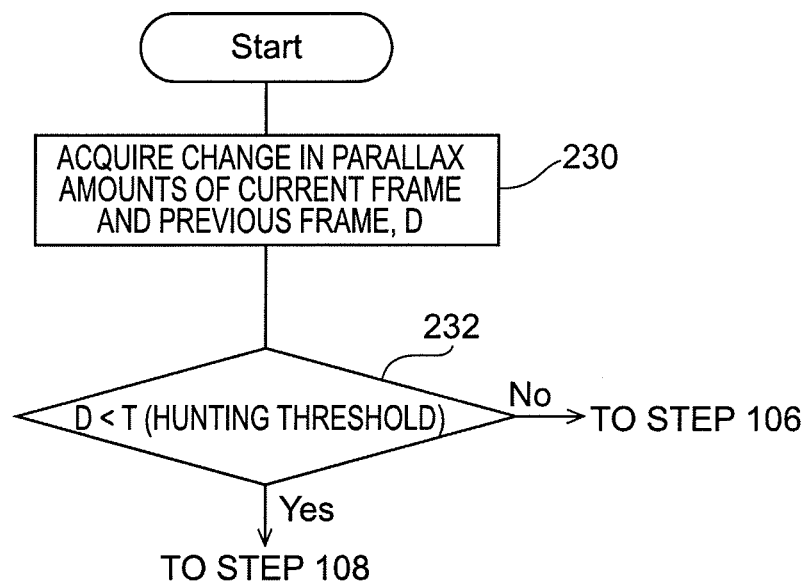
FIG. 13 is a flowchart showing a second hunting absence/presence judging routine.

FIG. 13 is a flowchart showing the second hunting absence/presence judging routine. The CPU 35 acquires a change amount D in the parallax amount of the current frame and the previous frame obtained at the three-dimensional processing section 30 (step 230). Then, the CPU 35 judges whether the change amount D is smaller than the hunting threshold value T(S<T) (step 232). When D<T, the CPU 35 judges that there is no hunting (there is no abnormality in the parallax amount), and proceeds to step 108 of FIG. 9. When D is not <T, the CPU 35 judges that there is hunting (there is an abnormality in the parallax amount), and proceeds to step 106 of FIG. 9.

(2) Judgment as to Allowed Limit of Parallax Amount

In step 104, the CPU 35 may judge whether the parallax amount has reached an allowed limit value that is set in advance. Here, the allowed limit means the threshold value of the parallax amount that indicates too much jumping-out or too much sinking-in of the object expressed by the stereographic image. When the parallax amount has reached the allowed limit value, the CPU 35 proceeds to step 106. When the parallax amount has not reached the allowed limit value, the CPU 35 proceeds to step 108.

(3) Judgment as to Object of Parallax Adjustment

In step 104, the CPU 35 may judge whether or not the object of parallax adjustment has been lost track of and can no longer be detected. An object or plural characteristic points or the like that are in the vicinity of the central position of the image plane, such as, for example, the face of a person or the like, corresponds to the object of parallax adjustment.

Here, when the object of parallax adjustment has not been detected in 10 frames for example, the CPU 35 judges that the object of parallax adjustment has been lost track of, and proceeds to step 106. When the object of parallax adjustment is not detected in 10 frames, the CPU 35 proceeds to step 108. Note that "10 frames" is merely an example, and another number of frames may be used. Due thereto, when the object of parallax adjustment is lost track of, the parallax adjustment control is switched, and therefore, parallax adjustment of three-dimensional video imaging can be stabilized.

(Switching of Parallax Adjustment Control)

In step 106, the CPU 35 switches the parallax adjustment control to another control. Here, any one processing among first through third switching processings is executed.

As the first switching processing, due to the CPU 35 defining a parallax amount maximum change amount per frame and setting it at the three-dimensional processing section 30, a limit is applied to the amount of change in the parallax amount per frame. Due thereto, parallax adjustment is carried out within the range of the parallax amount maximum change amount, and sudden changes in the parallax amount can be suppressed, and therefore, parallax adjustment of three-dimensional video imaging can be stabilized.

Further, as a second switching processing, the CPU 35 skips parallax adjustment at the frame in question (prohibits parallax adjustment at the frame in question), and continues the parallax adjustment of the previous frame as is. Namely, the parallax amount at the previous frame is used. Due thereto, even when there is an abnormality in the parallax amount, because parallax adjustment can be skipped, parallax adjustment of three-dimensional video imaging can be stabilized.

Figure 14:
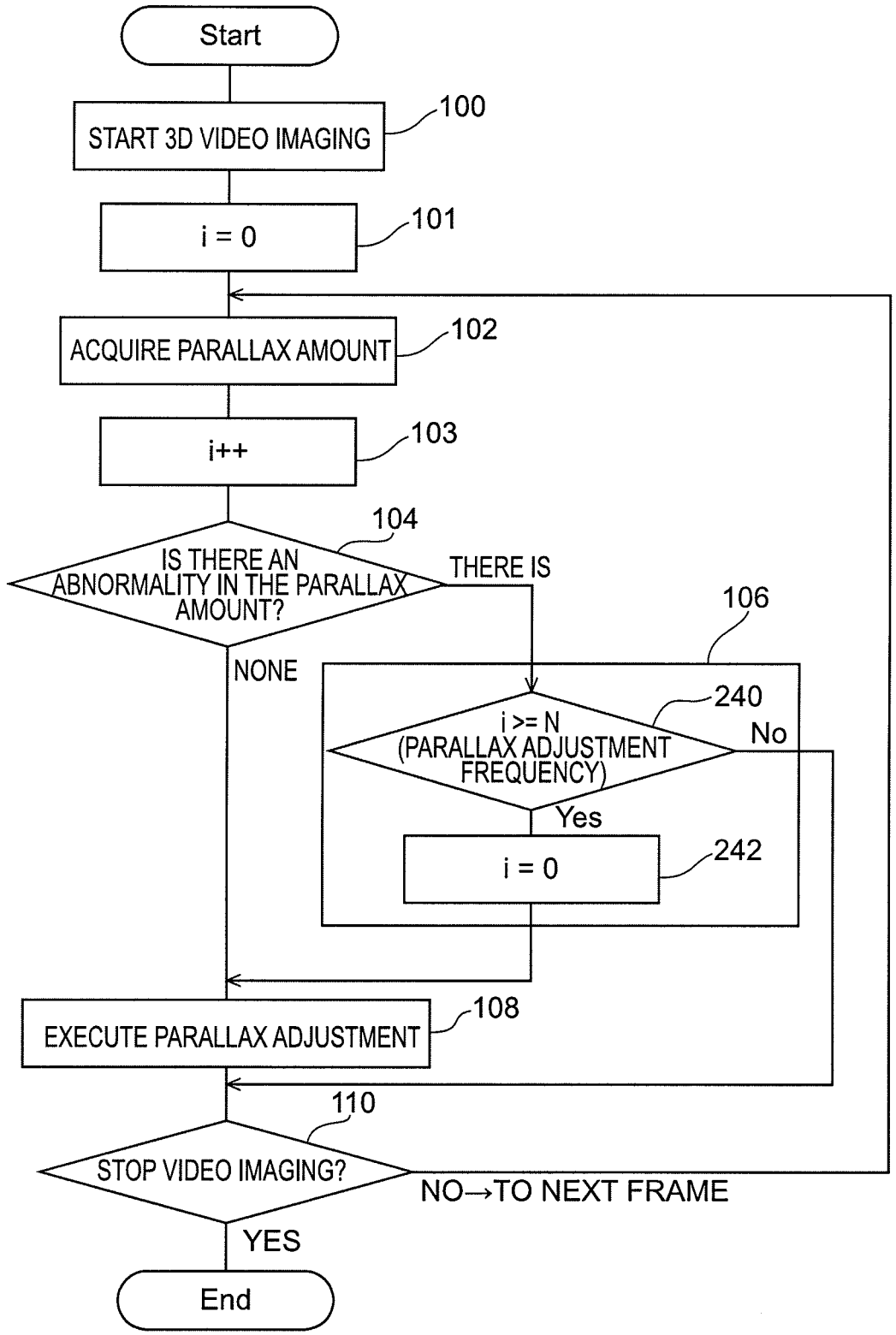
FIG. 14 is a flowchart showing a second parallax adjusting routine.

Moreover, as a third switching method, the CPU 35 reduces the frequency of executing parallax adjustment. Here, the second parallax adjusting routine shown in following FIG. 14 is executed instead of the parallax adjusting routine shown in FIG. 9. Note that steps that are the same as steps of FIG. 9 are denoted by the same reference numerals, and repeat description is omitted.

The parallax adjusting routine of FIG. 14 differs from FIG. 9 with regard to the point that index number i is set to i=0 after step 100 (step 101), and i is incremented by 1 (i++) after step 102 (step 103). Further, in step 106 in which the third switching processing is carried out, the following processing is carried out.

First, the CPU 35 judges whether the index number i is greater than or equal to parallax adjustment frequency N (i≥N) (step 240). Then, when i≥N, the CPU 35 sets i=0 (step 242), and proceeds to step 108. When i is not ≥N, the CPU 35 skips step 108 and proceeds to step 110.

Therefore, when the index number i is less than N, steps 102, 103, 104, 106 (step 240), 110 are executed repeatedly, and parallax adjustment (step 108) is not carried out. Further, when the index number i reaches N, the routine proceeds to step 108 through steps 104, 106 (steps 240, 242), and therefore, parallax adjustment is executed.

Accordingly, when there is an abnormality in the parallax, the parallax is adjusted one time each N frames, and the parallax is not adjusted each frame, and therefore, the frequency of parallax adjustment is reduced, and changes in the parallax adjustment can be made to be gentle.

In step 108, the CPU 35 causes the three-dimensional processing section 30 to execute parallax adjustment, and proceeds to step 110.

In step 110, the CPU 35 judges whether an instruction to stop video imaging is inputted from the release button 2. When the judgment is affirmative, the CPU 35 ends the present routine. When the judgment is negative, the CPU 35 shifts to processing of the next frame, and returns to step 102 again.

As described above, even when there is an abnormality in the parallax amount or when the parallax object has been lost track of, the composite eye camera 1 of the first embodiment carries out parallax adjustment after switching the parallax adjustment control. Accordingly, parallax adjustment of three-dimensional video imaging can be stabilized.

Note that, when the CPU 35 detects hunting, after executing parallax adjustment (after step 108 ends), the CPU 35 may record, in the recording medium 29, hunting information that expresses the absence/presence of hunting. Due thereto, because the absence/presence of hunting is added to the video information, the CPU 35 can utilize the hunting information at times of video playback, and parallax adjustment at the time of three-dimensional video playback can be stabilized. Further, a case is described in which, in step 104, any one of (1) judgment as to the absence/presence of hunting, (2) judgment as to the allowed limit of the parallax amount, and (3) judgment as to the object of parallax adjustment, is executed, but it suffices for at least one of (1) through (3) to be executed. Moreover, a case is described in which, in step 106, any one of the first through third switching processings is executed, but it suffices for at least one processing among the first through third switching processings to be executed.

[Second Embodiment]

A second embodiment of the present invention is described next. Note that regions that are the same as the first embodiment are denoted by the same reference numerals, and detailed description thereof is omitted. In the first embodiment, the first or second parallax adjusting routine is executed, but, in the second embodiment, the following third parallax adjusting routine is executed instead of the first or second parallax adjusting routine.

(Third Parallax Adjusting Routine)

Figure 15:
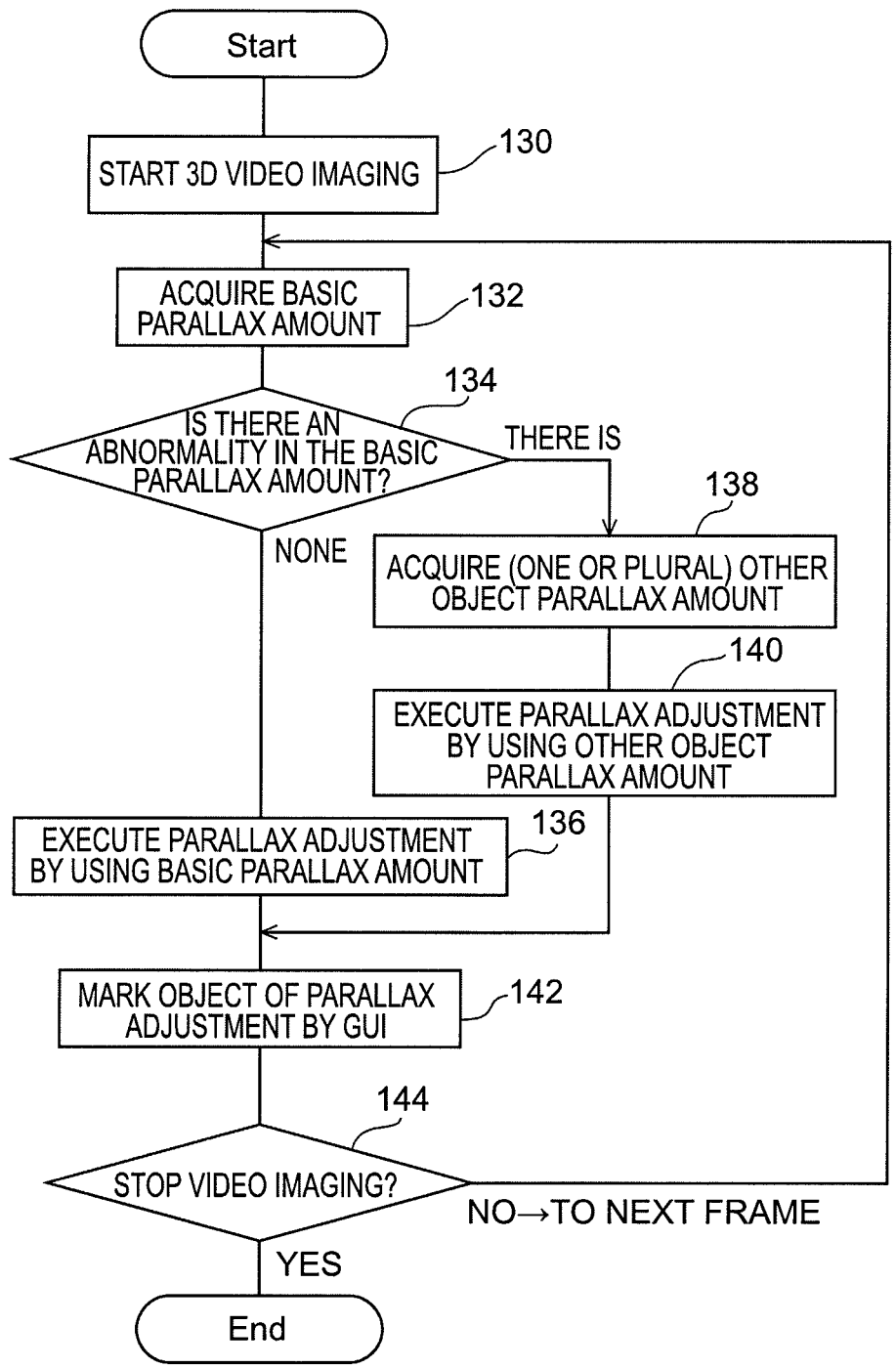
FIG. 15 is a flowchart showing a third parallax adjusting routine.

FIG. 15 is a flowchart showing the third parallax adjusting routine.

In step 130, when an instruction to start video imaging is inputted via the release button 2, the CPU 35 starts three-dimensional video imaging, and proceeds to step 132.

In step 132, the CPU 35 causes the three-dimensional processing section 30 to acquire a basic parallax amount that is based on the first and second images G1, G2 acquired at the imaging sections 21A, 21B, and proceeds to step 134. Here, the basic parallax amount means the parallax amount of a default object, and means the parallax amount of, for example, the object that is nearest to the center of the image plane.

In step 134, the CPU 35 judges whether or not there is an abnormality in the basic parallax amount acquired at the three-dimensional processing section 30. Here, the same processing as step 104 shown in FIG. 9 is executed. Then, when there is an abnormality in the basic parallax amount, the CPU 35 proceeds to step 138. When there is no abnormality, the CPU 35 proceeds to step 136.

In step 136, the CPU 35 controls the three-dimensional processing section 30 to carry out parallax adjustment by using the basic parallax amount, and proceeds to step 142.

On the other hand, in step 138, the CPU 35 causes the three-dimensional processing section 30 to acquire the parallax amount of another object, and proceeds to step 138. For example, the face of a person other than the default object, or the like, corresponds to the other object.

In step 140, the three-dimensional processing section 30 is controlled so as to execute parallax adjustment by using the parallax amount of the other object. At this time, the three-dimensional processing section 30 selects, as the "other object", an "object that is near to the default object in the Z direction", or an "object that is near to the default object in the two-dimensional coordinate", and carries out parallax adjustment by using the parallax amount of the selected object. Here, the same plane as the first and second images G1, G2 acquired at the imaging sections 21A, 21B is expressed by a two-dimensional coordinate (X, Y), and the direction orthogonal to this plane (the baseline) is the Z direction.

Accordingly, although it does not matter whether the "object that is near to the default object in the Z direction" is near in the two-dimensional coordinate, it is the object whose stereoscopic feel is nearest to the default object. Therefore, due to the three-dimensional processing section 30 carrying out parallax adjustment by using the parallax amount of that object, the three-dimensional processing section 30 can suppress sudden changes in the parallax amount, and as a result, can stably carry out parallax adjustment.

Further, although it does not matter whether the "object that is near to the default object in the two-dimensional coordinate" is near to the stereoscopic feel of the default object, it is the object that is closest to the default object in the two-dimensional coordinate. Therefore, due to the three-dimensional processing section 30 carrying out parallax adjustment by using the parallax amount of that object, the three-dimensional processing section 30 can carry out parallax adjustment by using an object that is close to the object of parallax adjustment until now, and as a result, can stably carry out parallax adjustment. Then, the CPU 35 proceeds to step 142 via the above-described processings.

Figure 16A:
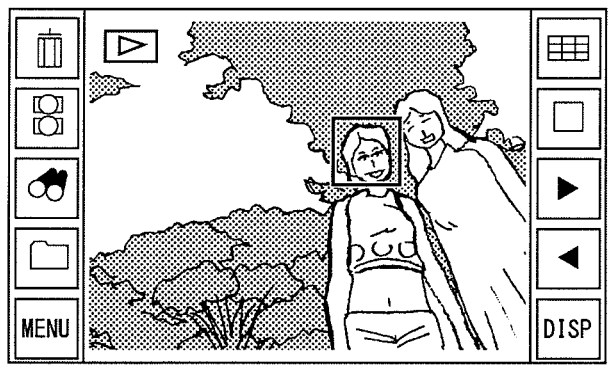
FIG. 16A is a drawing showing a state in which an object of parallax adjustment is marked by a GUI.
Figure 16B:
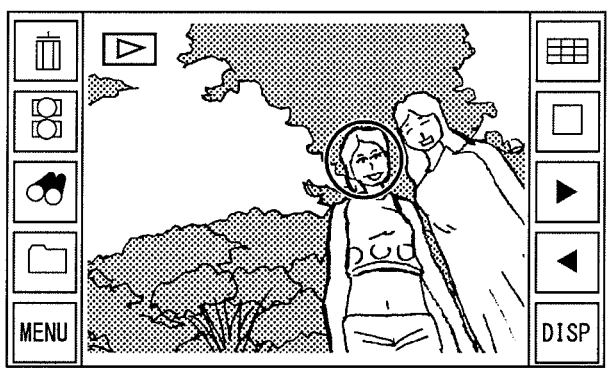
FIG. 16B is a drawing showing a state in which the object of parallax adjustment is marked by a GUI.
Figure 16C:
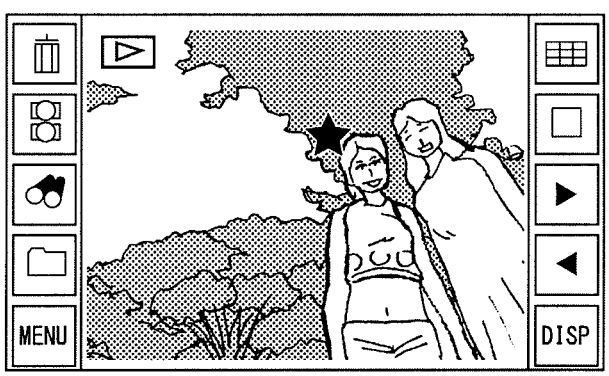
FIG. 16C is a drawing showing a state in which the object of parallax adjustment is marked by a GUI.

In step 142, the CPU 35 marks the object of parallax adjustment by a GUI (Graphical User Interface) and causes the monitor 7 to display it, and proceeds to step 144. Here, the face of the person that is the object of parallax adjustment may be, for example, surrounded by a square as shown in FIG. 16A, or surrounded by a circle as shown in FIG. 16B, or a star-shaped mark may be applied thereto as shown in FIG. 16C.

In step 144, the CPU 35 judges whether an instruction to stop video imaging is inputted from the release button 2. When the judgment is affirmative, the CPU 35 ends the present routine. When the judgment is negative, the CPU 35 shifts to processing to the next frame, and again returns to step 132.

As described above, even when there is an abnormality in the basic parallax amount of the default object or when the default object has been lost track of, the composite eye camera 1 of the second embodiment carries out parallax adjustment after switching the object of parallax adjustment to another object. Accordingly, parallax adjustment of three-dimensional video imaging can be stabilized.

Note that the present invention is not limited to the above-described embodiments, and can also be applied to structures whose design has been changed within the scope of the matter recited in the claims.

For example, in the above-described first and second embodiments, parallax related information may be acquired instead of directly acquiring the parallax amount.

Figure 18A:
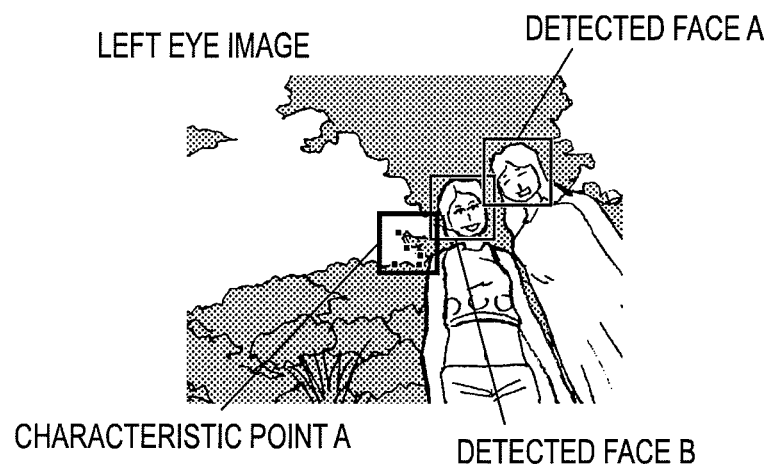
FIG. 18A is a drawing for explaining parallax related information.
Figure 18B:
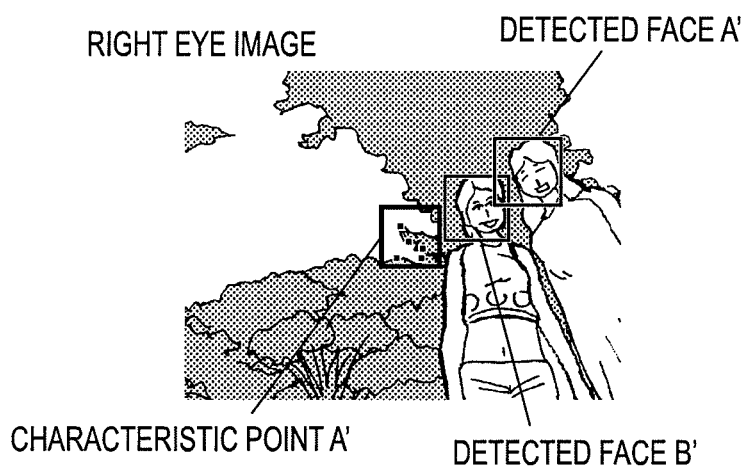
FIG. 18B is a drawing for explaining parallax related information.

FIG. 17 is a drawing showing an example of parallax related information. FIG. 18A and FIG. 18B are drawings for explaining the parallax related information. Information such as the coordinate group of a characteristic point A, the coordinate group of a characteristic face A, the coordinate group of a characteristic face B, the absence/presence of hunting, and the like for the left eye image (the first image G1) and the right eye image (the second image G2) of each frame correspond to the parallax related information. Then, the CPU 35 may carry out parallax adjustment by using these parallax related information.

[Third Embodiment]

A third embodiment of the present invention is described next. Note that regions and circuits that are the same as the first embodiment are denoted by the same reference numerals, and detailed description thereof is omitted. Although the first and second parallax adjusting routines are executed in the first embodiment, in the third embodiment, the following fourth parallax adjusting routine is executed instead of the first parallax adjusting routine, and a fifth parallax adjusting routine is executed instead of the second parallax adjusting routine, respectively.

Figure 20:
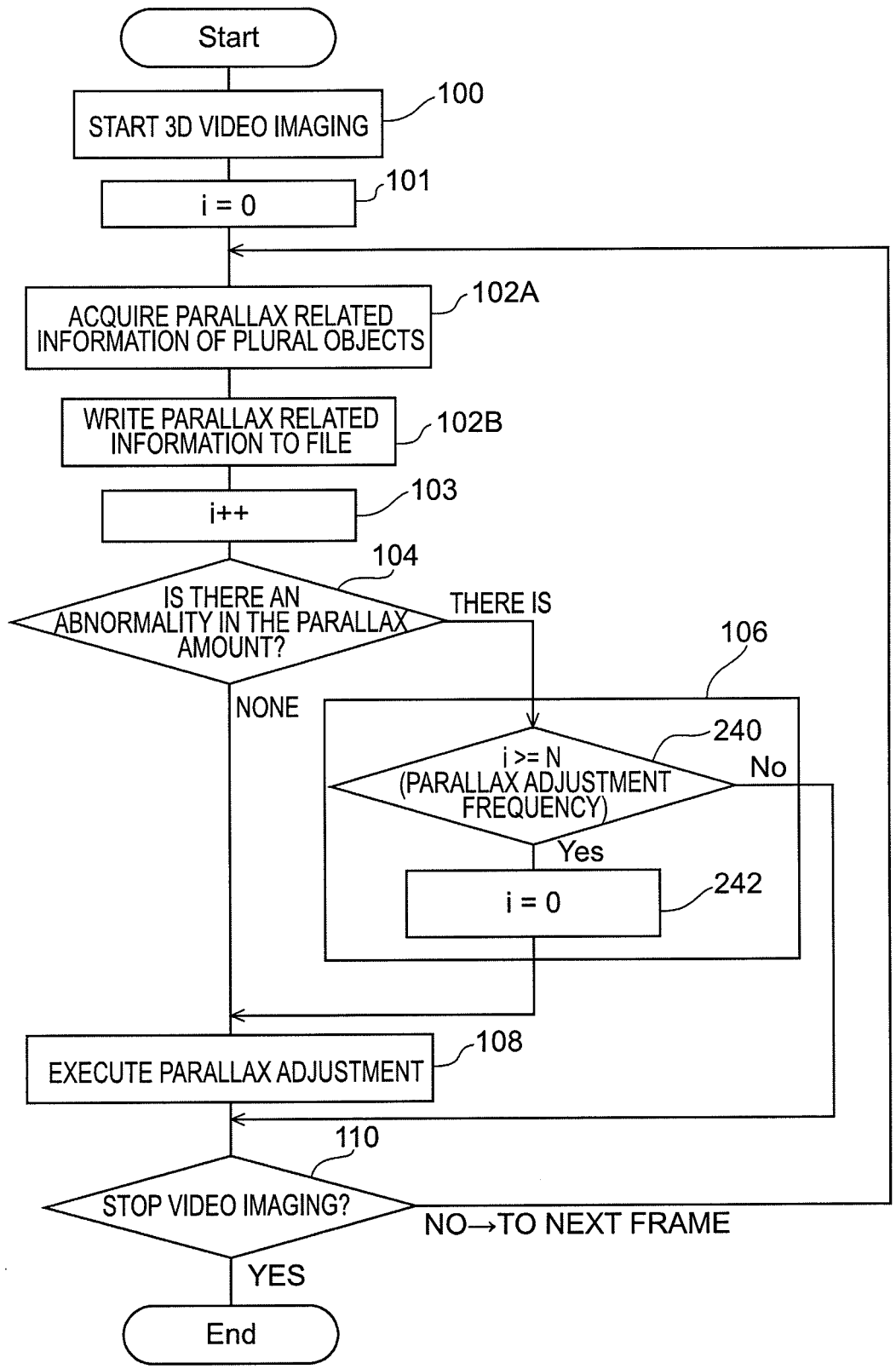
FIG. 20 is a flowchart showing a fifth parallax adjusting routine.

FIG. 19 is a flowchart showing the fourth parallax adjusting routine. FIG. 20 is a flowchart showing the fifth parallax adjusting routine. Note that the fourth parallax adjusting routine shown in FIG. 19 differs from FIG. 9 only with regard to the point that step 102A and step 102B are used instead of step 102 of the flowchart of the first parallax adjusting routine shown in FIG. 9. The fifth parallax adjusting routine shown in FIG. 20 differs from FIG. 14 only with regard to the point that step 102A and step 102B are used instead of step 102 in the flowchart of the second parallax adjusting routine shown in FIG. 14. Hereinafter, only step 102A and step 102B, that are the points that differ from FIG. 9 and FIG. 14, are described.

In step 102A, due to the CPU 35 causing the three-dimensional processing section 30 to execute the first or second parallax amount acquiring routine, the CPU 35 causes the three-dimensional processing section 30 to acquire parallax related information that relates to the parallax based on the first and second images G1, G2.

Due to the CPU 35 causing the three-dimensional processing section 30 to execute the first parallax amount acquiring routine shown in FIG. 10, the CPU 35 causes the three-dimensional processing section 30 to respectively detect the face regions of a same person from the first and second images G1, G2 acquired at the imaging sections 21A, 21B, and to acquire face detection coordinates, that express the coordinates of these face regions, as parallax related information (step 200). Then, the CPU 35 causes the three-dimensional processing section 30 to compute the coordinate difference of these face detection coordinates as parallax related information (step 202), and to compute the parallax amount from this coordinate difference as parallax related information (step 204).

Due to the CPU 35 causing the three-dimensional processing section 30 to execute the second parallax amount acquiring routine shown in FIG. 11, the CPU 35 causes the three-dimensional processing section 30 to respectively detect the same object from the first and second images G1, G2 acquired at the imaging sections 21A, 21B, and to acquire characteristic point coordinates, that are the coordinates of characteristic points that specify these objects, as parallax related information (step 210). The CPU 35 causes the three-dimensional processing section 30 to compute the coordinate difference of these characteristic point coordinates as parallax related information (step 212), and to compute the parallax amount from this coordinate difference as parallax related information (step 214).

In step 102B, the CPU 35 creates an electronic file in which the parallax related information, that the three-dimensional processing section 30 was made to acquire in step 102A, is associated with the first and second images G1, G2 that were used in step 102A. Note that, in the present third embodiment, an image file F0, in which the parallax related information is recorded as accessory information, is used as this file. When the first parallax amount acquiring routine shown in FIG. 10 or the second parallax amount acquiring routine shown in FIG. 11 is executed by the three-dimensional processing section 30, this file is created by the CPU 35 recording the parallax related information as accessory information in the image file F0 shown in FIG. 5.

Namely, when the second parallax amount acquiring routine shown in FIG. 10 is executed by the three-dimensional processing section 30, the CPU 35 records the face detection coordinates acquired in step 200 as accessory information for each of the first and second images G1, G2. Then, the CPU 35 records the coordinate difference computed in step 202 as accessory information of the corresponding first and second images G1, G2, and records the parallax amount computed in step 204 as accessory information of the corresponding first and second images G1, G2.

Further, when the second parallax amount acquiring routine shown in FIG. 11 is executed by the three-dimensional processing section 30, the CPU 35 records the characteristic point coordinates acquired in step 210 as accessory information for each of the first and second images G1, G2. Then, the CPU 35 records the coordinate difference computed in step 212 as accessory information of the corresponding first and second images G1, G2, and records the parallax amount computed in step 214 as accessory information of the corresponding first and second images G1, G2.

As described above, in accordance with the present third embodiment, because the composite eye camera 1 records parallax related information in the image file F0, the parallax related information can be effectively utilized when playing-back the stereoscopic image based on the first and second images G1, G2. Note that a utilization example in which the parallax related information is visibly displayed via the monitor 7 together with the stereoscopic image that is being played-back at the current time, a utilization example in which the parallax related information is audibly displayed by using a built-in speaker (not shown) when playing-back the related stereoscopic image, a utilization example in which the parallax related information is displayed so as to be permanently visible by using a printer (not shown) that is connected to the composite eye camera 1, and a utilization example in which the parallax related information is transmitted to an external device (not shown), are given as examples of utilizing the parallax related information.

[Fourth Embodiment]

A fourth embodiment of the present invention is described next. Note that regions and circuits that are the same as the second embodiment are denoted by the same reference numerals, and detailed description thereof is omitted. Although the third parallax adjusting routine is executed in the second embodiment, in the fourth embodiment, a sixth parallax adjusting routine is executed instead of the third parallax adjusting routine.

FIG. 21 is a flowchart showing the sixth parallax adjusting routine. Note that the sixth parallax adjusting routine shown in FIG. 21 differs from FIG. 15 only with regard to the point that step 132A and step 132B are used instead of step 132 of the flowchart of the third parallax adjusting routine shown in FIG. 15. Hereinafter, only step 132A and step 132B, that are the points that differ from FIG. 15, are described.

In step 132A, the CPU 35 causes the three-dimensional processing section 30 to acquire parallax related information that is information used for parallax adjustment at the time of play-back and relates to the parallax based on the first and second images G1, G2. In the present fourth embodiment, respective characteristic points (e.g., the center of gravity coordinates of the region having a predetermined spatial frequency) of the first and second images G1, G2, the coordinate difference between the characteristic point of the first image G1 and the characteristic point of the second image G1, and a basic parallax amount computed from this coordinate difference, are used as the parallax related information.

In step 132B, the CPU 35 creates an electronic file in which the parallax related information, that the three-dimensional processing section 30 was made to acquire in step 132A, is associated with the first and second images G1, G2 that were used in step 132A. Note that, in the present fourth embodiment, the image file F0, in which the parallax related information is recorded as accessory information, is used as this file. When the parallax related information is acquired by the three-dimensional processing section 30, this file is created by the CPU 35 recording the parallax related information as accessory information in the image file F0 shown in FIG. 5.

Namely, the CPU 35 records the respective characteristic points of the first and second images G1, G2 that were acquired in step 132A as accessory information for each of the first and second images G1, G2. Then, the CPU 35 records the coordinate difference acquired in step 132A as accessory information of the corresponding first and second images G1, G2, and records the basic parallax amount acquired in step 132A as accessory information of the corresponding first and second images G1, G2.

As described above, in accordance with the present fourth embodiment, because the composite eye camera 1 records parallax related information in the image file F0, the parallax related information can be effectively utilized when playing-back the stereoscopic image based on the first and second images G1, G2.

Note that the above-described third and fourth embodiments describe an example of a case in which, at the stage before carrying out the processing of the abnormality judgment of the parallax amount, the CPU 35 records the parallax related information in the image file F0, but the third and fourth embodiments are not limited to this. The CPU 35 may record the parallax related information in the image file F0 after the parallax adjustment is executed.

Further, the above-described third and fourth embodiments describe an example in which, by recording the parallax related information as accessory information of the image file F0, the parallax related information and the first and second images G1, G2 are collected in one electronic file, but the third and fourth embodiments are not limited to this. For example, a file that is separate from the image file F0 may be created as a file in which the parallax related information is recorded. In this case, an example is given of creating a file in which the parallax related information is associated with the first and the second images G1, G2 of the image file F0, and the corresponding parallax related information is associated with image specifying information that specifies the first and the second images G1, G2. Further, the first and second images G1, G2 and the parallax related information can be associated without creating a file. In this case, a form can be exemplified in which the specifying information that specifies the first and second images G1, G2 or the first and second images G1, G2 themselves are stored in one of two non-volatile memories, and the parallax related information that corresponds to those first and second images G1, G2 is stored in the other in association with the corresponding specifying information or the first and second images G1, G2 that are stored in the one non-volatile memory. Further, a form can be exemplified in which specifying information that specifies the first and second images G1, G2 or the first and second images G1, G2, and the parallax related information corresponding to this specifying information or first and second images G1, G2, are stored in association in one non-volatile memory.

Further, in the above-described third and fourth embodiments, information, that is information obtained from the first and second images G1, G2 and is used in order to acquire the parallax amount (e.g., information obtained in the stage before acquiring the parallax amount, such as the face detection coordinates or the coordinate difference or the like), and a parallax amount, are associated with the first and second images G1, G2 as parallax related information, but the third and fourth embodiments are not limited to this. For example, at least one information among these parallax related information, and information, that expresses at least one result of the result obtained by executing the first or second hunting absence/presence judging routine and the result of judgment as to the allowed limit of the parallax amount that was described in the above first embodiment and the result of judgment as to the object of parallax adjustment that was described in the above first embodiment (information expressing whether or not there is an abnormality in the parallax amount), and information expressing which of the switching processings among the first through third switching processings described in the above first embodiment was executed, may be associated with the first and second images G1, G2 that correspond with this information and on which parallax adjustment has been carried out. Further, when parallax adjustment is carried out by using the basic parallax amount described in the above second and fourth embodiments, information expressing that fact may be associated with at least one of the object itself that corresponds to that information, and the first and second images G1, G2 in which that object is included and that have undergone parallax adjustment. Further, when the parallax amount is acquired from another object as described in the above second and fourth embodiments, information expressing that fact may be associated with at least one of the object itself that corresponds to that information, and the first and second images G1, G2 in which that object is included and that have undergone parallax adjustment. Further, when the parallax amount of another object is adjusted as described in the above second and fourth embodiments, information expressing that fact may be associated with at least one of the object that corresponds to that information, and the first and second images G1, G2 in which that object is included and that have undergone parallax adjustment. Moreover, information expressing what object was used as the other object described in the above second and fourth embodiments may be associated with at least one of the object itself that corresponds to that information, and the first and second images G1, G2 in which that object is included and that have undergone parallax adjustment.

In this way, at least one information among information, that is information acquired from the first and second images G1, G2 and is used in order to acquire the parallax amount, and the parallax amount acquired by using that information, and information expressing whether or not a predetermined processing has been carried out by using that parallax amount, may be associated with the first and second images G1, G2 that correspond to that information and on which parallax adjustment has been carried out (for example, the default object or the other object in the above second and fourth embodiments). Due thereto, including parallax adjustment at the time of playback, effective utilization of information (parallax related information) that is related to the stereoscopic image that is played-back is possible.

EXPLANATION OF THE REFERENCE NUMERALS

7 monitor
21A, 21B imaging section
22 imaging control section
30 three-dimensional processing section
35 CPU

The invention claimed is:

1. A composite eye imaging device comprising:
   imaging sections that generate a plurality of viewpoint images per frame by imaging a same subject from a plurality of viewpoints, wherein the imaging sections generate a right eye image and a left eye image for each frame of consecutive frames;
   a parallax amount acquiring section that acquires a parallax amount on the basis of the plurality of viewpoint images generated by the imaging sections, wherein the parallax amount acquiring section detects a face from each of the right eye image and the left eye image and computes a parallax amount using a characteristic point of the detected face from the right eye image and a characteristic point of the detected face from the left eye image, and wherein the parallax amount acquiring section computes said parallax amount for each of the consecutive frames;
   an abnormality judging section that judges that there is an abnormality in the parallax amount in at least one case of a case in which fluctuation of a fixed interval in the parallax amount acquired by the parallax amount acquiring section is greater than a predetermined value, a case in which the parallax amount reaches an allowed limit value that is determined in advance, or a case in which an object of acquisition of the parallax amount can no longer be detected, and judges that there is no abnormality in the parallax amount in a case that is none of a case in which fluctuation of a fixed interval in the parallax amount is greater than a predetermined value, a case in which the parallax amount reaches an allowed limit value that is determined in advance, or a case in which an object of acquisition of the parallax amount can no longer be detected, wherein the abnormality judging section judges whether there is an abnormality in the parallax amount for each of the consecutive frames; and a parallax adjusting section that judges whether there is an abnormality in the parallax amount, such that:

when it is judged by the abnormality judging section that there is no abnormality in the parallax amount in one or more consecutive frames, the parallax adjusting section carries out a parallax adjustment for each of the consecutive frames for which there is no abnormality in the parallax amount, wherein said parallax adjustment is a first parallax adjustment, and the parallax adjusting section also increases an index number for each of the consecutive frames for which there is no abnormality in the parallax amount, and when it is judged by the abnormality judging section that there is an abnormality in the parallax amount, the parallax adjusting section switches to control of a second parallax adjustment that is different from the control of the first parallax adjustment, whereby in the control of the second parallax adjustment the parallax adjusting section lowers a parallax adjustment frequency such that the parallax adjusting section carries out said parallax adjustment for each N frame of the consecutive frames, wherein N is a predetermined adjustment parameter higher than 1, such that:

when it is judged by the abnormality judging section that there is an abnormality in the parallax amount in one consecutive frame, the parallax adjusting section increases said index number for said one consecutive frame and checks if said index number corresponding to said one consecutive frame is less than N, and if said index number is less than N, then the parallax adjusting section does not carry out said parallax adjustment for said one consecutive frame, but if said index number is at least N, the parallax adjusting section carries out said parallax adjustment for said one consecutive frame.

2. The composite eye imaging device of claim 1, wherein, when it is judged by the abnormality judging section that there is an abnormality in the parallax amount, the parallax adjusting section carries out parallax adjustment within a range of a parallax amount maximum change amount that is determined in advance.

3. The composite eye imaging device of claim 1 or claim 2, wherein, when it is judged by the abnormality judging section that there is an abnormality in the parallax amount, the parallax adjusting section carries out parallax adjustment by using a parallax amount of a previous frame.

4. The composite imaging device of claim 2, further comprising an associating section that associates at least one information of information that is obtained from the plurality of viewpoint images generated by the imaging sections and that is used for acquiring the parallax amount at the parallax amount acquiring section, information that expresses the parallax amount acquired by the parallax amount acquiring section by using the information obtained from the plurality of viewpoint images, or information expressing whether or not a predetermined processing has been carried out by using the parallax amount, with the plurality of viewpoint images that correspond to the at least one information and on which parallax adjustment has been carried out.

5. The composite imaging device of claim 1, further comprising an associating section that associates at least one information of information that is obtained from the plurality of viewpoint images generated by the imaging sections and that is used for acquiring the parallax amount at the parallax amount acquiring section, information that expresses the parallax amount acquired by the parallax amount acquiring section by using the information obtained from the plurality of viewpoint images, or information expressing whether or not a predetermined processing has been carried out by using the parallax amount, with the plurality of viewpoint images that correspond to the at least one information and on which parallax adjustment has been carried out.

6. The composite eye imaging device of claim 5, wherein the associating section associates the at least one information with the plurality of viewpoint images that correspond to the at least one information and on which parallax adjustment has been carried out, and collects the at least one information in one electronic file.

7. The composite eye imaging device of claim 1, wherein the parallax amount acquiring section computes the parallax amount using a plurality of characteristic points of the detected face from the right eye image, and a plurality of characteristic points of the detected face from the left eye image.

8. The composite eye imaging device of claim 1, wherein, after said index number becomes at least N and the parallax adjusting section carries out said parallax adjustment for said one consecutive frame, said index number is reset.

9. A composite eye imaging device comprising:

imaging sections that generate a plurality of viewpoint images per frame by imaging a same subject from a plurality of viewpoints, wherein the imaging sections generate a right eye image and a left eye image for each frame of consecutive frames;

a parallax amount acquiring section that acquires a parallax amount of a predetermined object on the basis of the plurality of viewpoint images generated by the imaging sections, wherein the parallax amount acquiring section detects a face from each of the right eye image and the left eye image and computes a parallax amount using a characteristic point of the detected face from the right eye image and a characteristic point of the detected face from the left eye image, and wherein the parallax amount acquiring section computes said parallax amount for each of the consecutive frames;

an abnormality judging section that judges that there is an abnormality in the parallax amount in at least one case of a case in which fluctuation of a fixed interval in the parallax amount acquired by the parallax amount acquiring section is greater than a predetermined value, a case in which the parallax amount reaches an allowed limit value that is determined in advance, or a case in which an object of acquisition of the parallax amount can no longer be detected, wherein the abnormality judging section judges whether there is an abnormality in the parallax amount for each of the consecutive frames; and a parallax adjusting section that judges whether there is an abnormality in the parallax amount, such that:

when it is judged by the abnormality judging section that there is no abnormality in the parallax amount in one or more consecutive frames, the parallax adjusting section carries out a parallax adjustment of the predetermined object for each of the consecutive frames for which there is no abnormality in the parallax amount, wherein said parallax adjustment is a first parallax adjustment, and the parallax adjusting section also increases an index number for each of the consecutive frames for which there is no abnormality in the parallax amount, and when it is judged by the abnormality judging section that there is an abnormality in the parallax amount, the parallax adjusting section switches to control of a second parallax adjustment that is different from the control of the first parallax adjustment, whereby in the control of the second parallax adjustment the parallax adjusting section lowers a parallax adjustment frequency and carries out parallax adjustment on another object that is different than the predetermined object, such that the parallax adjusting section carries out said parallax adjustment for each N frame of the consecutive frames, wherein N is a predetermined adjustment parameter higher than 1, such that:

when it is judged by the abnormality judging section that there is an abnormality in the parallax amount in one consecutive frame, the parallax adjusting section increases said index number for said one consecutive frame and checks if said index number corresponding to said one consecutive frame is less than N, and if said index number is less than N, then the parallax adjusting section does not carry out said parallax adjustment for said one consecutive frame, but if said index number is at least N, the parallax adjusting section carries out said parallax adjustment for said one consecutive frame.

10. The composite eye imaging device of claim 9, wherein the parallax adjusting section makes an object, which has a closest distance to the predetermined object in a direction orthogonal to an image plane of the viewpoint images, be the other object.

11. The composite eye imaging device of claim 9, wherein the parallax adjusting section makes an object, which has a closest distance to the predetermined object in an image plane of the viewpoint images, be the other object.

12. The composite imaging device of claim 9, further comprising an associating section that associates at least one information of information that is obtained from the plurality of viewpoint images generated by the imaging sections and that is used for acquiring the parallax amount at the parallax amount acquiring section, information that expresses the parallax amount acquired by the parallax amount acquiring section by using the information obtained from the plurality of viewpoint images, or information expressing whether or not a predetermined processing has been carried out by using the parallax amount, with the predetermined object or the other object that corresponds to the at least one information and on which parallax adjustment has been carried out.

13. The composite eye imaging device of claim 12, wherein the associating section associates the at least one information with the predetermined object or the other object that corresponds to the at least one information and on which parallax adjustment has been carried out, and collects the at least one information in one electronic file.

14. The composite eye imaging device of claim 9, wherein the parallax amount acquiring section computes the parallax amount using a plurality of characteristic points of the detected face from the right eye image, and a plurality of characteristic points of the detected face from the left eye image.

15. The composite eye imaging device of claim 9, wherein, after said index number becomes at least N and the parallax adjusting section carries out said parallax adjustment for said one consecutive frame, said index number is reset.

16. A parallax adjusting method of a composite eye imaging device, the method comprising:

acquiring a parallax amount on the basis of a plurality of viewpoint images generated by imaging sections that generate the plurality of viewpoint images per frame by imaging a same subject from a plurality of viewpoints, wherein the plurality of viewpoint images are a right eye image and a left eye image for each frame of consecutive frames, wherein said acquiring step detects a face from each of the right eye image and the left eye image and computes a parallax amount using a characteristic point of the detected face from the right eye image and a characteristic point of the detected face from the left eye image, and wherein the acquiring step computes said parallax amount for each of the consecutive frames;

judging that there is an abnormality in the parallax amount in at least one case of a case in which fluctuation of a fixed interval in the acquired parallax amount is greater than a predetermined value, a case in which the parallax amount reaches an allowed limit value that is determined in advance, or a case in which an object of acquisition of the parallax amount can no longer be detected, and judging that there is no abnormality in the parallax amount in a case that is none of a case in which fluctuation of a fixed interval in the parallax amount is greater than a predetermined value, a case in which the parallax amount reaches an allowed limit value that is determined in advance, or a case in which an object of acquisition of the parallax amount can no longer be detected, wherein the judging step judges whether there is an abnormality in the parallax amount for each of the consecutive frames; and when it is judged that there is no abnormality in the parallax amount in one or more consecutive frames, carrying out a parallax adjustment for each of the consecutive frames for which there is no abnormality in the parallax amount, wherein said parallax adjustment is a first parallax adjustment, and also increasing an index number for each of the consecutive frames for which there is no abnormality in the parallax amount, and, when it is judged that there is an abnormality in the parallax amount, switching to control of a second parallax adjustment that is different from the control of the first parallax adjustment, whereby the control of the second parallax adjustment lowers a parallax adjustment frequency such that said parallax adjustment for each N frame of the consecutive frames is carried out, wherein N is a predetermined adjustment parameter higher than 1, such that:

when it is judged that there is an abnormality in the parallax amount in one consecutive frame, said index number for said one consecutive frame is increased and a check is performed to determine if said index number corresponding to said one consecutive frame is less than N, and if said index number is less than N, then said parallax adjustment for said one consecutive frame is not carried out, but if said index number is at least N, said parallax adjustment for said one consecutive frame is carried out.

17. The parallax adjusting method of claim 16, wherein the acquiring step computes the parallax amount using a plurality of characteristic points of the detected face from the right eye image, and a plurality of characteristic points of the detected face from the left eye image.

18. The parallax adjusting method of claim 16, wherein, after said index number becomes at least N and said parallax adjustment for said one consecutive frame is carried out, said index number is reset.

19. A parallax adjusting method of a composite eye imaging device, the method comprising:

acquiring a parallax amount of a predetermined object on the basis of a plurality of viewpoint images generated by imaging sections that generate the plurality of viewpoint images per frame by imaging a same subject from a plurality of viewpoints, wherein the plurality of viewpoint images are a right eye image and a left eye image for each frame of consecutive frames, wherein said acquiring step detects a face from each of the right eye image and the left eye image and computes a parallax amount using a characteristic point of the detected face from the right eye image and a characteristic point of the detected face from the left eye image, and wherein the acquiring step computes said parallax amount for each of the consecutive frames;

judging that there is an abnormality in the parallax amount in at least one case of a case in which fluctuation of a fixed interval in the acquired parallax amount is greater than a predetermined value, a case in which the parallax amount reaches an allowed limit value that is determined in advance, of a case in which an object of acquisition of the parallax amount can no longer be detected, and judging that there is no abnormality in the parallax amount in a case that is none of a case in which fluctuation of a fixed interval in the parallax amount is greater than a predetermined value, a case in which the parallax amount reaches an allowed limit value that is determined in advance, or a case in which an object of acquisition of the parallax amount can no longer be detected, wherein the judging step judges whether there is an abnormality in the parallax amount for each of the consecutive frames; and when it is judged that there is no abnormality in the parallax amount in one or more consecutive frames, carrying out a parallax adjustment of the predetermined object for each of the consecutive frames for which there is no abnormality in the parallax amount, wherein said parallax adjustment is a first parallax adjustment, and also increasing an index number for each of the consecutive frames for which there is no abnormality in the parallax amount, and, when it is judged that there is an abnormality in the parallax amount, switching to control of a second parallax adjustment that is different from the control of the first parallax adjustment, whereby the control of the second parallax adjustment lowers a parallax adjustment frequency and carries out parallax adjustment on another object that is different than the predetermined object, said parallax adjustment for each N frame of the consecutive frames being carried out, wherein N is a predetermined adjustment parameter higher than 1, such that:

when it is judged that there is an abnormality in the parallax amount in one consecutive frame, said index number for said one consecutive frame is increased and a check is performed to determine if said index number corresponding to said one consecutive frame is less than N, and if said index number is less than N, then said parallax adjustment for said one consecutive frame is not carried out, but if said index number is at least N, said parallax adjustment for said one consecutive frame is carried out.

20. The parallax adjusting method of claim 19, wherein the acquiring step computes the parallax amount using a plurality of characteristic points of the detected face from the right eye image, and a plurality of characteristic points of the detected face from the left eye image.

21. The parallax adjusting method of claim 19, wherein, after said index number becomes at least N and said parallax adjustment for said one consecutive frame is carried out, said index number is reset.

22. A non-transitory computer-readable medium storing a parallax adjusting program of a composite eye imaging device including computer-readable instructions, the parallax adjusting program when executed causing a computer to function as:

a parallax amount acquiring section that acquires a parallax amount on the basis of a plurality of viewpoint images generated by imaging sections that generate the plurality of viewpoint images per frame by imaging a same subject from a plurality of viewpoints, wherein the plurality of viewpoint images are a right eye image and a left eye image for each frame of consecutive frames, and wherein the parallax amount acquiring section detects a face from each of the right eye image and the left eye image and computes a parallax amount using a characteristic point of the detected face from the right eye image and a characteristic point of the detected face from the left eye image, and wherein the parallax amount acquiring section computes said parallax amount for each of the consecutive frames;

an abnormality judging section that judges that there is an abnormality in the parallax amount in at least one case of a case in which fluctuation of a fixed interval in the parallax amount acquired by the parallax amount acquiring section is greater than a predetermined value, a case in which the parallax amount reaches an allowed limit value that is determined in advance, or a case in which an object of acquisition of the parallax amount can no longer be detected, and judges that there is no abnormality in the parallax amount in a case that is none of a case in which fluctuation of a fixed interval in the parallax amount is greater than a predetermined value, a case in which the parallax amount reaches an allowed limit value that is determined in advance, or a case in which an object of acquisition of the parallax amount can no longer be detected, wherein the abnormality judging section judges whether there is an abnormality in the parallax amount for each of the consecutive frames; and a parallax adjusting section that judges whether there is an abnormality in the parallax amount, such that:

when it is judged by the abnormality judging section that there is no abnormality in the parallax amount in one or more consecutive frames, the parallax adjusting section carries out a parallax adjustment for each of the consecutive frames for which there is no abnormality in the parallax amount, wherein said parallax adjustment is a first parallax adjustment, and the parallax adjusting section also increases an index number for each of the consecutive frames for which there is no abnormality in the parallax amount, and when it is judged by the abnormality judging section that there is an abnormality in the parallax amount, the parallax adjusting section switches to control of a second parallax adjustment that is different from the control of the first parallax adjustment, whereby in the control of the second parallax adjustment the parallax adjusting section lowers a parallax adjustment frequency such that the parallax adjusting section carries out said parallax adjustment for each N frame of the consecutive frames, wherein N is a predetermined adjustment parameter higher than 1, such that:

when it is judged by the abnormality judging section that there is an abnormality in the parallax amount in one consecutive frame, the parallax adjusting section increases said index number for said one consecutive frame and checks if said index number corresponding to said one consecutive frame is less than N, and if said index number is less than N, then the parallax adjusting section does not carry out said parallax adjustment for said one consecutive frame, but if said index number is at least N, the parallax adjusting section carries out said parallax adjustment for said one consecutive frame.

23. The non-transitory computer-readable medium storing the parallax adjusting program of claim 22, wherein the parallax amount acquiring section computes the parallax amount using a plurality of characteristic points of the detected face from the right eye image, and a plurality of characteristic points of the detected face from the left eye image.

24. The non-transitory computer-readable medium storing the parallax adjusting program of claim 22, wherein, after said index number becomes at least N and the parallax adjusting section carries out said parallax adjustment for said one consecutive frame, said index number is reset.

25. A non-transitory computer-readable medium storing a parallax adjusting program of a composite eye imaging device including computer-readable instructions, the parallax adjusting program when executed causing a computer to function as:

a parallax amount acquiring section that acquires a parallax amount of a predetermined object on the basis of a plurality of viewpoint images generated by imaging sections that generate the plurality of viewpoint images per frame by imaging a same subject from a plurality of viewpoints, wherein the plurality of viewpoint images are a right eye image and a left eye image for each frame of consecutive frames, and wherein the parallax amount acquiring section detects a face from each of the right eye image and the left eye image and computes a parallax amount using a characteristic point of the detected face from the right eye image and a characteristic point of the detected face from the left eye image, and wherein the parallax amount acquiring section computes said parallax amount for each of the consecutive frames;

an abnormality judging section that judges that there is an abnormality in the parallax amount in at least one case of a case in which fluctuation of a fixed interval in the parallax amount acquired by the parallax amount acquiring section is greater than a predetermined value, a case in which the parallax amount reaches an allowed limit value that is determined in advance, or a case in which an object of acquisition of the parallax amount can no longer be detected, and judges that there is no abnormality in the parallax amount in a case that is none of a case in which fluctuation of a fixed interval in the parallax amount is greater than a predetetinined value, a case in which the parallax amount reaches an allowed limit value that is determined in advance, or a case in which an object of acquisition of the parallax amount can no longer be detected, wherein the abnormality judging section judges whether there is an abnormality in the parallax amount for each of the consecutive frames; and a parallax adjusting section that judges whether there is an abnormality in the parallax amount, such that:

when it is judged by the abnormality judging section that there is no abnormality in the parallax amount in one or more consecutive frames, the parallax adjusting section carries out a parallax adjustment of the predetermined object for each of the consecutive frames for which there is no abnormality in the parallax amount, wherein said parallax adjustment is a first parallax adjustment, and the parallax adjusting section also increases an index number for each of the consecutive frames for which there is no abnormality in the parallax amount, and when it is judged by the abnormality judging section that there is an abnormality in the parallax amount, the parallax adjusting section switches to control of a second parallax adjustment that is different from the control of the first parallax adjustment, whereby in the control of the second parallax adjustment the parallax adjusting section lowers a parallax adjustment frequency and carries out parallax adjustment on another object that is different than the predete miined object, such that the parallax adjusting section carries out said parallax adjustment for each N frame of the consecutive frames, wherein N is a predetermined adjustment parameter higher than 1, such that:

when it is judged by the abnormality judging section that there is an abnormality in the parallax amount in one consecutive frame, the parallax adjusting section increases said index number for said one consecutive frame and checks if said index number corresponding to said one consecutive frame is less than N, and if said index number is less than N, then the parallax adjusting section does not carry out said parallax adjustment for said one consecutive frame, but if said index number is at least N, the parallax adjusting section carries out said parallax adjustment for said one consecutive frame.

26. The non-transitory computer-readable medium storing the parallax adjusting program of claim 25, wherein the parallax amount acquiring section computes the parallax amount using a plurality of characteristic points of the detected face from the right eye image, and a plurality of characteristic points of the detected face from the left eye image.

27. The non-transitory computer-readable medium storing the parallax adjusting program of claim 25, wherein, after said index number becomes at least N and the parallax adjusting section carries out said parallax adjustment for said one consecutive frame, said index number is reset.

* * * * *